United States Patent
Tsuda

(10) Patent No.: US 8,823,584 B2
(45) Date of Patent: Sep. 2, 2014

(54) POSITION INFORMATION DETECTION DEVICE, COMMUNICATION APPARATUS, AND COMMUNICATION SYSTEM

(75) Inventor: Shinichiro Tsuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 378 days.

(21) Appl. No.: 13/287,766

(22) Filed: Nov. 2, 2011

(65) Prior Publication Data

US 2012/0119948 A1     May 17, 2012

(30) Foreign Application Priority Data

Nov. 11, 2010   (JP) ................................ P2010-252412

(51) Int. Cl.
*G01S 19/46*      (2010.01)
*G01S 19/48*      (2010.01)
*G01S 19/34*      (2010.01)

(52) U.S. Cl.
CPC *G01S 19/48* (2013.01); *G01S 19/34* (2013.01)
USPC .................................................. 342/357.29

(58) Field of Classification Search
USPC ................................................... 342/357.29
See application file for complete search history.

(56) References Cited

U.S. PATENT DOCUMENTS

| 2005/0113124 A1* | 5/2005 | Syrjarinne et al. ............. 455/522 |
| 2006/0119508 A1* | 6/2006 | Miller ....................... 342/357.17 |
| 2007/0109184 A1 | 5/2007 | Shyr et al. |
| 2008/0150797 A1* | 6/2008 | Jia et al. ................... 342/357.06 |

FOREIGN PATENT DOCUMENTS

| JP | 2005-337855 | 12/2005 |
| JP | 2007-139772 | 6/2007 |
| JP | 2008-298484 | 12/2008 |

* cited by examiner

*Primary Examiner* — Harry Liu
(74) *Attorney, Agent, or Firm* — Sherr & Jiang, PLLC

(57) ABSTRACT

A position detection device includes a first position obtaining unit obtaining position information by receiving a GPS signal, a second position obtaining unit obtaining position information based on information obtained from a plurality of peripheral base stations, a position information obtainment determining unit determining whether or not the first position obtaining unit obtains position information, a movement detection unit detecting a movement of the first position obtaining unit, a first ON and OFF state control unit controlling ON and OFF states of the first position obtaining unit, a second ON and OFF state control unit controlling ON and OFF states of the second position obtaining unit, a monitor cycle control unit controlling a monitor cycle that the first position obtaining unit obtains position information, and an output unit selecting and outputting one piece of position information obtained by the first position obtaining unit and the second position obtaining unit.

20 Claims, 11 Drawing Sheets

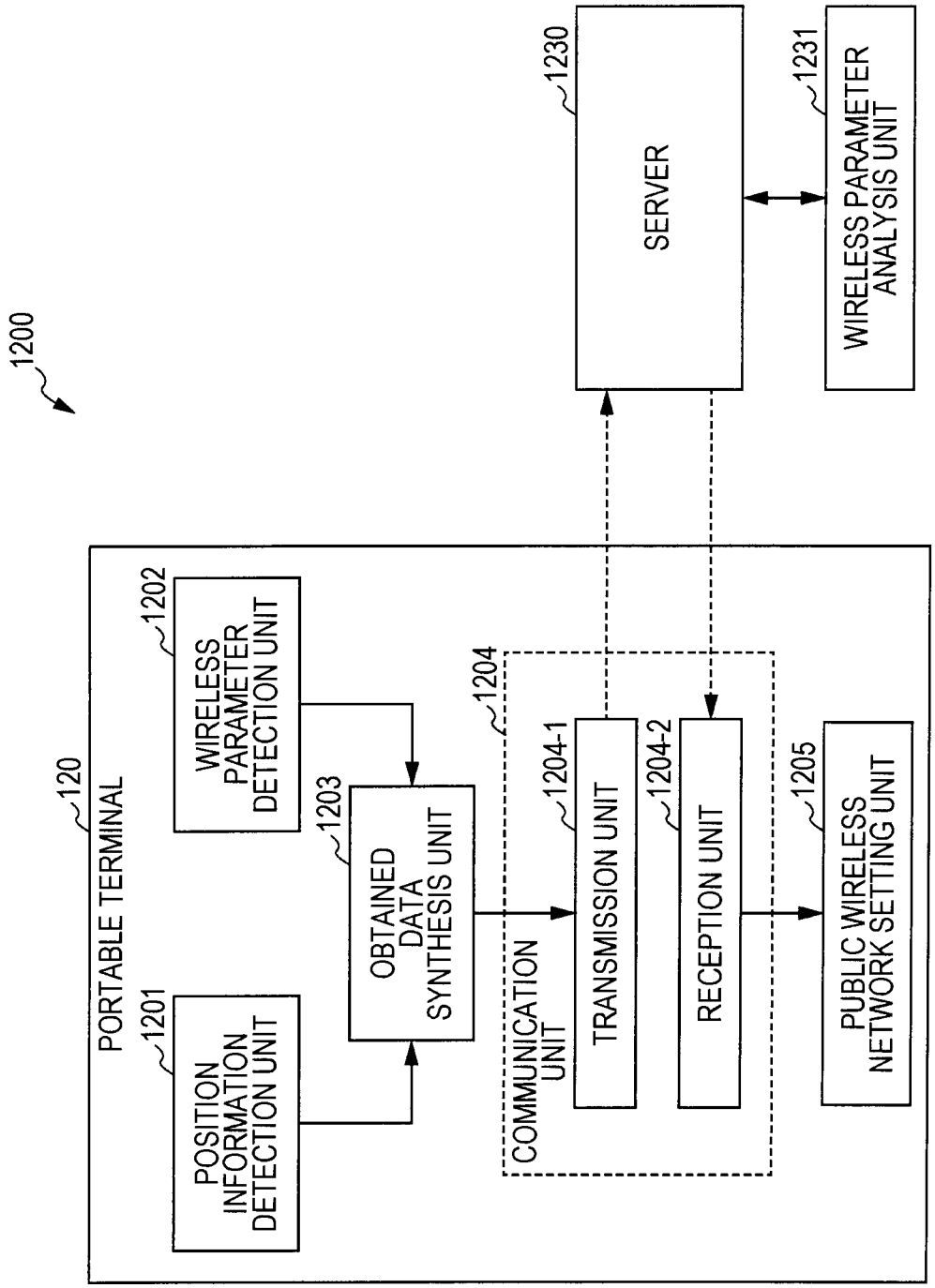

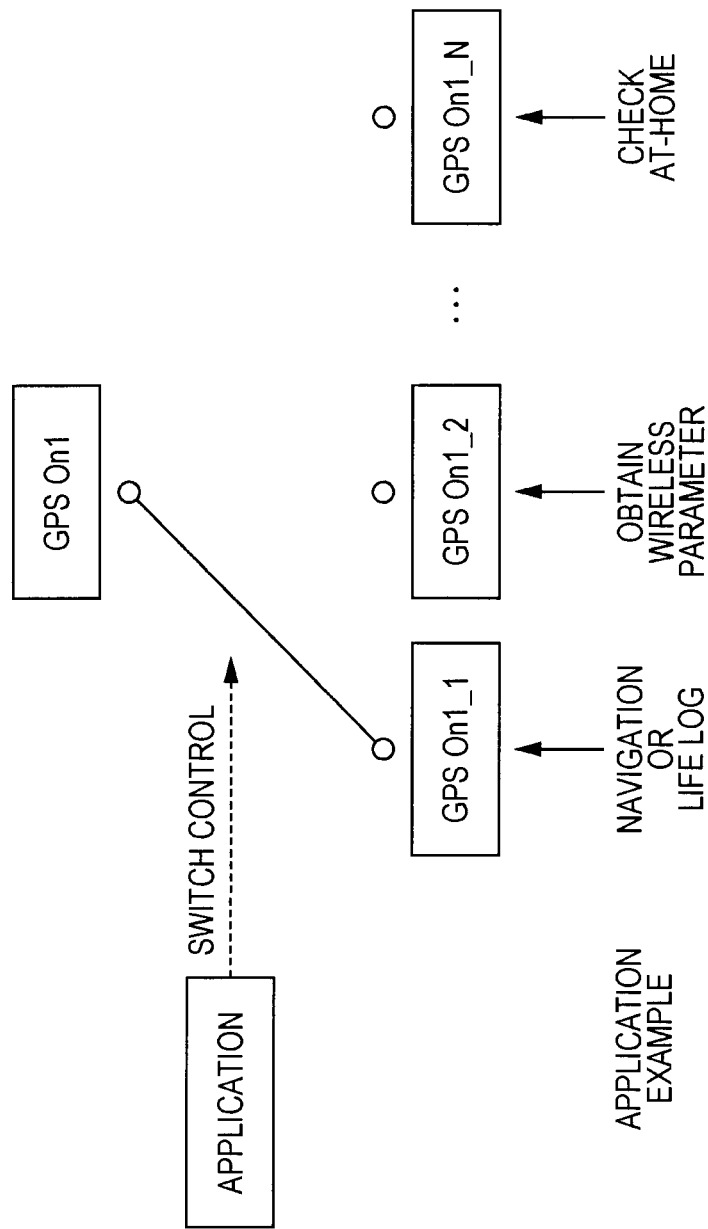

POSITION INFORMATION DETECTION DEVICE, COMMUNICATION APPARATUS, AND COMMUNICATION SYSTEM

BACKGROUND

The present disclosure relates to a position information detection device applicable to a battery-driven terminal such as, for example, a mobile phone, and more particularly to a position information detection device, a communication apparatus, and a communication system, performing hybrid positioning by combining GPS position information and other position information.

Since 2002, a mobile phone service of a 3G method called the third generation has been in use in Japan. Low-volume packet services such as voice or mail messages were the main application at first. Thereafter, by introducing HSDPA (High Speed Downlink Access) which improves a packet communication rate in a downlink from a base station to a terminal, or the like, downloading of larger-sized packets such as downloading of music files or use (watching) of a moving image sharing service such as YouTube (registered trademark), has been performed.

In addition, along with the increase in capacity of downloaded packets, the wireless network side has also enlarged, and, for example, in the 3GPP system, a HAPA+ service which realizes a maximum of 21 Mbps has started, and, in the IEEE system, a Mobile WiMAX service to realize a maximum of 40 Mbps has started. Further, in the 3GPP system, an LTE (Long Term Evolution) service which uses OFDMA (Orthogonal Frequency Division Multiple Access) in the downlink in a manner similar to the Mobile WiMAX (Worldwide Interoperability for Microwave Access), is scheduled to start in the latter half of the year 2010, and a 4G (LTE-Advanced) service is also scheduled to start around the year 2015. From the start of the services, it is expected that a maximum of 1 Gbps will be realized in semifixed circumstances, and a maximum of 100 Mbps will be realized even in movement circumstances.

In addition, with the variation such as an increase in use of downloading of large-volume data, there has been increasing use of high performance wireless communication terminals called "smart phones" which mainly perform packet communication. In addition, when telecommunications carriers and service providers using the Internet provide further user-oriented services to users in mobile circumstances, position information is becoming increasingly more important information. Under such circumstances, most smart phones have a GPS (Global Positioning System) receiver for detecting position information mounted therein. For example, there has been proposed a wireless communication system in which a base station provides position information of a high accuracy estimation position to a mobile terminal of which a GPS signal is not able to be captured (for example, refer to Japanese Unexamined Patent Application Publication No. 2008-298484). The mobile terminal can operate an application or the like which provides information depending on a current position, based on the high accuracy position information provided from the base station.

The GPS receiver can obtain position information with relatively high accuracy of several meters to several tens of meters in circumstances where signals are able to be received from a GPS satellite. However, a portable terminal which is driven by a battery such as a mobile phone is sensitive to power consumption, and thus there is a problem in that it is difficult to obtain position information by operating the GPS receiver at all times.

For example, there has been proposed a position information measurement system in which a server side receives a current position from a GPS terminal and designates a position where the next position is measured on a movement route of the GPS terminal, the GPS terminal calculates a movement time from the current position to the position where the next position is measured, and the GPS terminal stops the position measurement operation for the movement time (for example, refer to Japanese Unexamined Patent Application Publication No. 2005-337855). Since the GPS terminal stops the movement measurement operation for the calculated movement time, power consumption can be reduced. However, it is difficult to apply the system to a target of which a movement route is not identified.

In addition, since a portable terminal such as a mobile phone is used in a place where a GPS signal is not able to be received such as an indoor location or a basement in many cases, it is preferable to obtain position information with as high accuracy as possible in various circumstances by including position information obtaining functions in addition to the GPS receiver.

For example, there is a technique in which electric measurement information is obtained from a plurality of peripheral public wireless base stations (Wi-Fi access points or 3G base stations), and a current position is measured in real-time based on a balance of the respective reception signal intensities. According to the technique, since the public wireless base station has a wide coverage, it is possible to measure a current position even in a place where a GPS signal is not able to be received such as an indoor location or a basement. However, the base stations are arranged with the units of several kilometers, and thus there is a problem in that the technique has accuracy lower than the GPS.

There is hybrid positioning where positioning is performed by combining position estimations using both position information estimated from Wi-Fi electric measurement information and GPS position information. According to the hybrid positioning, a position can be estimated from Wi-Fi electric measurement information at an indoor location where the GPS is not able to be used, and a position can be obtained from the GPS at a place where Wi-Fi access points are not present in the vicinity.

In addition, there has been proposed a receiver which receives a global positioning system (GPS) signal and a digital broadcasting system (DBS) signal, determines presence states and signal intensities of the GPS signal and the DBS signal via a signal detector of the receiver, selects one positioning mode from a plurality of positioning modes of a signal processing unit of the receiver based on the detected signal presence states and the signal intensities of the signals, and determines a position of the receiver based on the selected positioning mode (for example, refer to Japanese Unexamined Patent Application Publication No. 2007-139772).

SUMMARY

It is desirable to provide an excellent position information detection device, communication apparatus, and communication system, which are applicable to a battery-driven terminal such as a mobile phone, and can appropriately perform hybrid positioning where GPS position information and other pieces of position information are combined.

According to an embodiment of the present disclosure, there is provided a position detection device including a first position obtaining unit that obtains position information by receiving a GPS (Global Positioning System) signal; a second position obtaining unit that obtains position information based on information obtained from a plurality of peripheral base stations (the base station corresponds to a Wi-Fi access point or a 3G base station); a position information obtainment determining unit that determines whether or not the first position obtaining unit obtains position information; a movement detection unit that detects a movement of the first position obtaining unit; a first ON and OFF state control unit that controls ON and OFF states of the first position obtaining unit based on a result detected by the movement detection unit or a result determined by the position information obtainment determining unit; a second ON and OFF state control unit that controls ON and OFF states of the second position obtaining unit based on a result determined by the position information obtainment determining unit; a monitor cycle control unit that controls a monitor cycle that the first position obtaining unit obtains position information based on a result detected by the movement detection unit or a result determined by the position information obtainment determining unit; and an output unit that selects and outputs one of two pieces of position information obtained by the first position obtaining unit and the second position obtaining unit.

The monitor cycle control unit may shorten the monitor cycle if the movement detection unit detects that the first position obtaining unit is moved, and lengthen the monitor cycle if the movement detection unit detects that the first position obtaining unit is not moved.

The position detection device may further include a counting unit that counts a time period where the movement detection unit detects a movement of the first position obtaining unit if the movement detection unit detects the movement of the first position obtaining unit again after the first position obtaining unit is detected as not being moved. In this case, the monitor cycle control unit may return the monitor cycle to a short monitor cycle after the counting unit counts a first predetermined time period.

In addition, the second ON and OFF state control unit may make the second position obtaining unit enter an ON state if the position information obtainment determining unit determines that the first position obtaining unit is not able to obtain position information.

The position detection device may further include a counting unit that counts a time period where the position information obtainment determining unit determines that the first position obtaining unit is not able to obtain position information. In this case, the monitor cycle control unit may lengthen the monitor cycle after the counting unit counts a second predetermined time period.

In addition, the first ON and OFF state control unit may make the first position obtaining unit enter an OFF state if the movement detection unit detects that the first position obtaining unit is not moved in a state where the long monitor cycle is set.

Further, the first ON and OFF state control unit may make the first position obtaining unit enter an OFF state if the movement detection unit detects that the first position obtaining unit is not moved, and the position information obtainment determining unit determines that the first position obtaining unit is not able to obtain position information.

The first ON and OFF state control unit may make the first position obtaining unit enter an ON state in response to the movement detection unit detecting a movement of the first position obtaining unit when the first position obtaining unit is in an OFF state.

The second ON and OFF state control unit may make the second position obtaining unit enter an OFF state in response to the position information obtainment determining unit determining that the first position obtaining unit can obtain position information when the second position obtaining unit is in an ON state.

The movement detection unit may include an acceleration detection unit that detects acceleration caused by a movement of the first position obtaining unit and a distance calculation unit that calculates a movement distance of the first position obtaining unit for a predetermined time based on the acceleration detected by the acceleration detection unit. For example, the distance calculation unit detects that the first position obtaining unit is moved when a variation of a predetermined value or more in a position of the first position obtaining unit is detected. In addition, the monitor cycle control unit is configured to control the monitor cycle based on the movement distance calculated by the distance calculation unit.

The monitor cycle control unit may have one or a plurality of threshold values, and perform a control such that the monitor cycle is shortened if the movement distance exceeds each threshold value, and the monitor cycle is lengthened if the movement distance is less than each threshold value.

According to another embodiment of the present disclosure, there is provided a position detection device including a first position obtaining unit that obtains position information by receiving a GPS signal; a movement detection unit that detects a movement of the first position obtaining unit; and a monitor cycle control unit that controls a monitor cycle that the first position obtaining unit obtains position information based on a result detected by the movement detection unit, wherein the monitor cycle control unit lengthens the monitor cycle if the movement detection unit detects that the first position obtaining unit is not moved, and shortens the monitor cycle if a time period where the movement detection unit again detects a movement of the first position obtaining unit reaches a predetermined value.

According to still another embodiment of the present disclosure, there is provided a position detection device including a first position obtaining unit that obtains position information by receiving a GPS signal; a second position obtaining unit that obtains position information based on information obtained from a plurality of peripheral base stations; a position information obtainment determining unit that determines whether or not the first position obtaining unit obtains position information; a movement detection unit that detects a movement of the first position obtaining unit; a second ON and OFF state control unit that controls ON and OFF states of the second position obtaining unit based on a result determined by the position information obtainment determining unit; a monitor cycle control unit that controls a monitor cycle that the first position obtaining unit obtains position information based on a result detected by the movement detection unit or a result determined by the position information obtainment determining unit; and an output unit that selects and outputs one of two pieces of position information obtained by the first position obtaining unit and the second position obtaining unit, wherein the monitor cycle control unit lengthens the monitor cycle if the movement detection unit detects that the first position obtaining unit is not moved, and shortens the monitor cycle if a time period where the movement detection unit again detects a movement of the first position obtaining unit reaches a predetermined value, and wherein the second ON and OFF state control unit makes the second position obtaining unit enter an ON state if the position information obtainment determining unit determines that the first position obtaining unit is not able to obtain position information, and makes the second position obtaining unit enter an OFF state in response to the position information obtainment determining unit determining that the first position obtaining unit can obtain position information when the second position obtaining unit is in the ON state.

According to still another embodiment of the present disclosure, there is provided a position detection device including a first position obtaining unit that obtains position information by receiving a GPS signal; a second position obtaining unit that obtains position information based on information obtained from a plurality of peripheral base stations; a position information obtainment determining unit that determines whether or not the first position obtaining unit obtains position information; a movement detection unit that detects a movement of the first position obtaining unit; a second ON and OFF state control unit that controls ON and OFF states of the second position obtaining unit based on a result determined by the position information obtainment determining unit; a monitor cycle control unit that controls a monitor cycle that the first position obtaining unit obtains position information based on a result detected by the movement detection unit or a result determined by the position information obtainment determining unit; and an output unit that selects and outputs one of two pieces of position information obtained by the first position obtaining unit and the second position obtaining unit, wherein the monitor cycle control unit lengthens the monitor cycle if the movement detection unit detects that the first position obtaining unit is not moved, and shortens the monitor cycle if a time period where the movement detection unit again detects a movement of the first position obtaining unit reaches a predetermined value, and wherein the second ON and OFF state control unit makes the second position obtaining unit enter an ON state if the position information obtainment determining unit determines that the first position obtaining unit is not able to obtain position information in a case where the short monitor cycle is set, and makes the second position obtaining unit enter an OFF state in response to the position information obtainment determining unit determining that the first position obtaining unit can obtain position information when the second position obtaining unit is in the ON state.

According to still another embodiment of the present disclosure, there is provided a position detection device including a first position obtaining unit that obtains position information by receiving a GPS signal; a second position obtaining unit that obtains position information based on information obtained from a plurality of peripheral base stations; a position information obtainment determining unit that determines whether or not the first position obtaining unit obtains position information; a movement detection unit that detects a movement of the first position obtaining unit; a first ON and OFF state control unit that controls ON and OFF states of the first position obtaining unit based on a result detected by the movement detection unit or a result determined by the position information obtainment determining unit; a second ON and OFF state control unit that controls ON and OFF states of the second position obtaining unit based on a result determined by the position information obtainment determining unit; and an output unit that selects and outputs one of two pieces of position information obtained by the first position obtaining unit and the second position obtaining unit, wherein the second ON and OFF state control unit makes the second position obtaining unit enter an ON state if the position information obtainment determining unit determines that the first position obtaining unit is not able to obtain position information, and makes the second position obtaining unit enter an OFF state in response to the position information obtainment determining unit determining that the first position obtaining unit can obtain position information when the second position obtaining unit is in the ON state, and wherein the first ON and OFF state control unit makes the first position obtaining unit enter an OFF state if the movement detection unit detects that the first position obtaining unit is not moved, and the position information obtainment determining unit determines that the first position obtaining unit is not able to obtain position information in a case where the second position obtaining unit is in an ON state, and the first ON and OFF state control unit makes the first position obtaining unit enter an ON state in response to the movement detection unit detecting a movement of the first position obtaining unit when the first position obtaining unit is in the OFF state.

According to still another embodiment of the present disclosure, there is provided a position detection device including a first position obtaining unit that obtains position information by receiving a GPS signal; a second position obtaining unit that obtains position information based on information obtained from a plurality of peripheral base stations in a normally ON state; a position information obtainment determining unit that determines whether or not the first position obtaining unit obtains position information; a movement detection unit that detects a movement of the first position obtaining unit; a first ON and OFF state control unit that controls ON and OFF states of the first position obtaining unit based on a result detected by the movement detection unit or a result determined by the position information obtainment determining unit; a monitor cycle control unit that controls a monitor cycle that the first position obtaining unit obtains position information based on a result detected by the movement detection unit or a result determined by the position information obtainment determining unit; and an output unit that selects and outputs one of two pieces of position information obtained by the first position obtaining unit and the second position obtaining unit, wherein the first ON and OFF state control unit makes the first position obtaining unit enter an OFF state if the movement detection unit detects that the first position obtaining unit is not moved, and the position information obtainment determining unit determines that the first position obtaining unit is not able to obtain position information in a case where the monitor cycle is short, the first ON and OFF state control unit makes the first position obtaining unit enter an ON state in response to the movement detection unit detecting a movement of the first position obtaining unit when the first position obtaining unit is in the OFF state, thereby obtaining a position at the short monitor cycle, and the first ON and OFF state control unit makes the first position obtaining unit enter an OFF state if the movement detection unit detects that the first position obtaining unit is not moved in a case where the monitor cycle is long, and wherein the monitor cycle control unit lengthens the monitor cycle again if a time period where the movement detection unit does not detect a movement of the first position obtaining unit reaches a predetermined value.

According to still another embodiment of the present disclosure, there is provided a communication apparatus including the position detection device according to the embodiment; a communication unit that is wirelessly connected to any of a plurality of peripheral base stations and performs communication; a wireless parameter detection unit that detects wireless parameters when the communication unit receives signals from the plurality of base stations; and an obtained data analysis unit that correlates the wireless parameters detected by the wireless parameter detection unit with position information and time information detected by the position detection device, wherein data created by the obtained data analysis unit is transmitted from the communication unit.

According to still another embodiment of the present disclosure, there is provided a communication system including one or more communication apparatuses including the position detection device according to the embodiment, a communication unit that is wirelessly connected to any of a plurality of peripheral base stations and performs communication, a wireless parameter detection unit that detects wireless parameters when the communication unit receives signals from the plurality of base stations, an obtained data analysis unit that correlates the wireless parameters detected by the wireless parameter detection unit with position information and time information detected by the position detection device, and a wireless network setting unit; and a server collecting the wireless parameters correlated with the position information and the time information from the one or more communication apparatuses and performing an evaluation, wherein the one or more communication apparatuses perform settings for the wireless network setting unit based on a determination result of the wireless parameters received from the server.

At this time, the "system" described here refers to a system where a plurality of devices (or functional modules realizing specific functions) are logically integrated, and whether or not the devices or the functional modules are housed in a single casing is not particularly considered.

The wireless parameters correlated with the position information and the time information may include information regarding the state of congestion of a base station or a communication rate, or wireless parameters capable of deriving the state of congestion of a base station or a communication rate.

The wireless parameters correlated with the position information and the time information may include a reception level of a pilot signal obtained by correlation detection of scramble codes allocated to one or a plurality of base stations corresponding to a code division multiple access method, or numerical values calculated from pilot signals received from a plurality of base stations, information regarding the state of congestion of a base station, and an expected value of a communication rate of a base station.

The wireless parameters correlated with the position information and the time information may include information regarding a ratio of the number of sub-carriers allocated to a user with respect to a total number of sub-carriers for each frame, included in signals received from one or a plurality of base stations corresponding to an orthogonal frequency division multiple access method, information regarding a traffic situation of each base station, information regarding a ratio of the number of sub-carriers allocated to a user with respect to a total number of sub-carriers for each frame, information regarding the state of congestion of a base station, or an expected value of a communication rate of a base station.

According to the embodiments of the present disclosure, it is possible to provide an excellent position information detection device, communication apparatus, and communication system, which can reduce power consumption due to a position detection performed by a GPS receiver by appropriately performing hybrid positioning where GPS position information and other pieces of position information are combined, and can detect a position with necessary accuracy.

According to the embodiments of the present disclosure, the position detection device which can perform hybrid positioning where, for example, GPS position information and other pieces of position information are combined can perform a switching operation such that a position measurement process is performed using a GPS receiver in circumstances where a GPS signal is not able to be received, and the position measurement process is performed via a public wireless base station in circumstances where the GPS signal is not able to be received.

In addition, according to the embodiments of the present disclosure, the position detection device controls a frequency of the position measurement process using the GPS receiver and controls the position measurement process using the GPS receiver to be stopped, depending on an operation state of the position detection device (or a terminal device having the position detection device mounted therein), and thereby it is possible to reduce power consumption due to the position detection using the GPS receiver and to perform the position detection with necessary accuracy.

According to the embodiments of the present disclosure, it is possible to reduce power consumption by decreasing a frequency of obtaining a position using a GPS signal when there is little movement.

According to the embodiments of the present disclosure, the transitioned state where a frequency of obtaining a position using a GPS signal is changed is made to have hysteresis by detecting a movement, and thereby it is possible to prevent the transition from being generated at a very high frequency.

In addition, according to the embodiments of the present disclosure, it is possible to obtain position information based on information obtained from a plurality of peripheral base stations by making the second position obtaining unit enter an ON state, when a GPS signal is not able to be received. Further, according to the embodiments of the present disclosure, if the GPS signal can be received again, it is possible to obtain high accuracy position information using the GPS signal by making the second position obtaining unit enter an OFF state.

According to the embodiments of the present disclosure, if a time period where a GPS signal is not able to be received exceeds a predetermined value, since it is not able to be expected that the GPS signal can be received even if there is a movement, low power consumption is achieved by reducing a frequency of obtaining a position using the GPS signal.

According to the embodiments of the present disclosure, if a time period where a GPS signal is not able to be received exceeds a predetermined value and a movement is not detected, since there is little possibility that there may be a variation to a state of being capable of receiving the GPS signal, low power consumption is further achieved by stopping a position obtaining process using the GPS signal.

According to the embodiments of the present disclosure, since there is little possibility that there may be a variation to a state of being capable of receiving a GPS signal in a state of being incapable of receiving the GPS signal and of also not being moved, low power consumption is achieved by stopping obtaining a position using the GPS signal.

Further, according to the embodiments of the present disclosure, the communication apparatus can detect wireless parameters in communicating with each of a plurality of peripheral base stations in a wireless manner, and also correlate the detected wireless parameters with position information and time information.

According to the embodiments of the present disclosure, in the communication system including one or more communication apparatuses and the server, the server side can analyze wireless parameters collected from the respective communication apparatuses and evaluate each of a plurality of wireless base stations located around a position of each portable terminal. In addition, the communication apparatuses can set a wireless network based on the evaluated result received from the server.

BRIEF DESCRIPTION OF THE DRAWINGS

FIG. 12 is a diagram schematically illustrating a configuration example of the communication system including a portable terminal having a function of obtaining position information and detecting wireless parameters, and a server collecting the wireless parameters from the portable terminal.

FIG. 13 is a diagram illustrating a structure for changing an initial value (GPS On1) of a monitor cycle depending on an application program during activation on the portable terminal, included in the monitor cycle control unit.

DETAILED DESCRIPTION OF EMBODIMENTS

Hereinafter, embodiments of the present disclosure will be described in detail with reference to the accompanying drawings.

Figure 1:
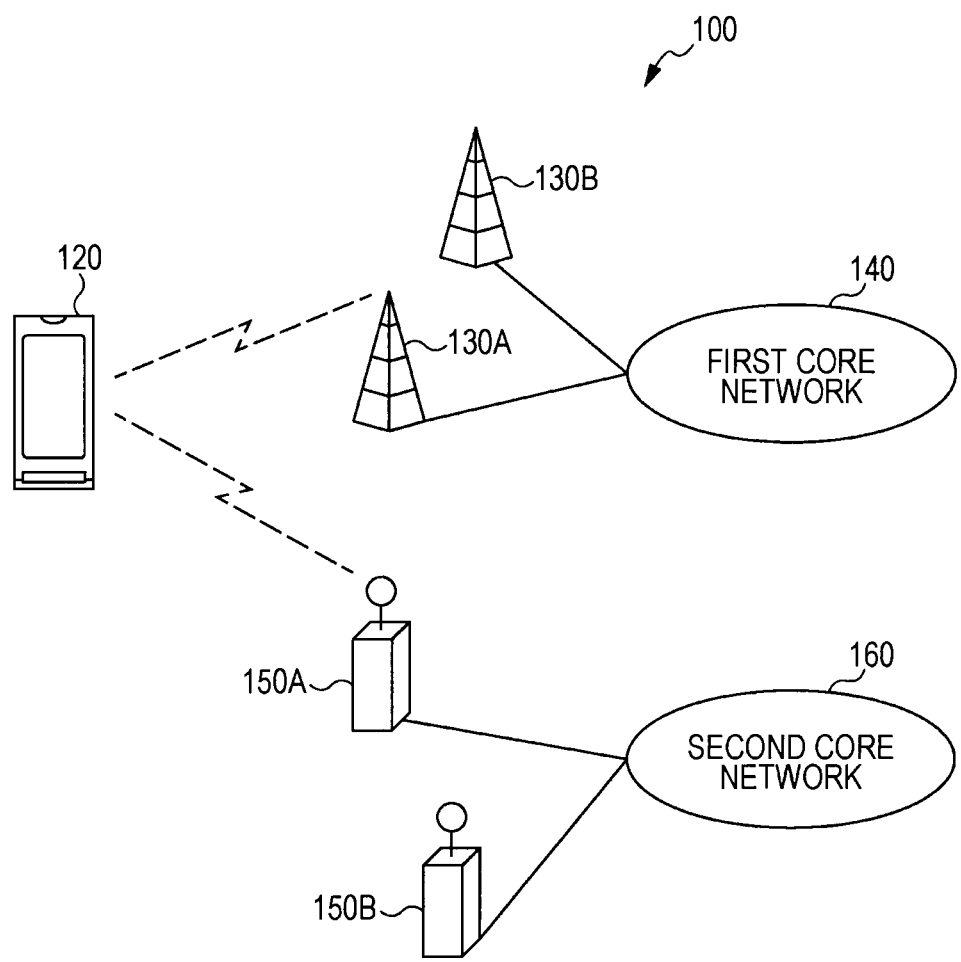
FIG. 1 is a diagram schematically illustrating a configuration example of the communication system according to an embodiment of the present disclosure.

FIG. 1 schematically shows a configuration example of the communication system according to an embodiment of the present disclosure. In the shown communication system 100, methods for trying to access a plurality of telecommunications carriers are introduced in managing a SIM (Subscriber Identity Module) of a portable wireless communication terminal device, or heterogeneous wireless circumstances where a plurality of wireless communication services are considered.

The shown communication system 100 includes a portable terminal 120, a plurality of first base stations 130A and 130B, a first core network 140, a plurality of second base stations 150A and 150B, and a second core network 160.

The first core network 140 is a network of a telecommunications carrier for providing a first wireless communication service (for example, a 3G service), and is connected to a plurality of first base stations 130. The first core network 140 includes, for example, an MME (Mobile Management Entity) performing setting, opening, a control of handover of sessions for data communication, or the like, or a gateway controlling routing, transmission, or the like of user data.

The second core network 160 is a network of a telecommunications carrier for providing a second wireless communication service (for example, LTE, WiMAX, 4G, or the like), and is connected to a plurality of second base stations 150. The second core network 160 includes the MME or the gateway in the same manner as the first core network 140.

The base stations such as the first base stations 130 and the second base stations 150 control communication with the portable terminal 120. For example, the base stations relay data received from the portable terminal 120 so as to direct to a destination, and, if receiving data addressed to the portable terminal 120, transmits the data to the portable terminal 120. In addition, the base stations can communicate with the portable terminal 120 by employing a wireless multiple access method such as orthogonal frequency division multiple access (OFDMA), time division multiple access (TDMA), or code division multiple access (CDMA).

The portable terminal 120 can perform communication of a variety of data with other devices via the first base stations 130 or the second base stations 150. The variety of data includes music data such as music, lectures, and radio programs, video data such as movies, television programs, video programs, photographs, documents, web pages, pictures, and charts, games, software, and the like.

In addition, although, in FIG. 1, the portable terminal 120 is shown as an example of the wireless communication apparatus, the wireless communication apparatus is not limited to the example. For example, the wireless communication apparatus may be an information processing apparatus such as a PC (Personal Computer), a video processing device for households (a DVD recorder, a video deck, or the like), a PDA (Personal Digital Assistant), a household video game console, or an appliance. Further, the wireless communication apparatus may be an information processing apparatus such as a mobile phone, a PHS (Personal Handyphone System), a portable music player, a portable video processing device, or a portable video game console.

In addition, the first base stations 130 and the second base stations 150, a variety of base stations such as macro cell base stations, relay nodes relaying communication between the macro cell base stations and the portable terminal 120, or household small-sized femtocells may be considered.

Figure 2:
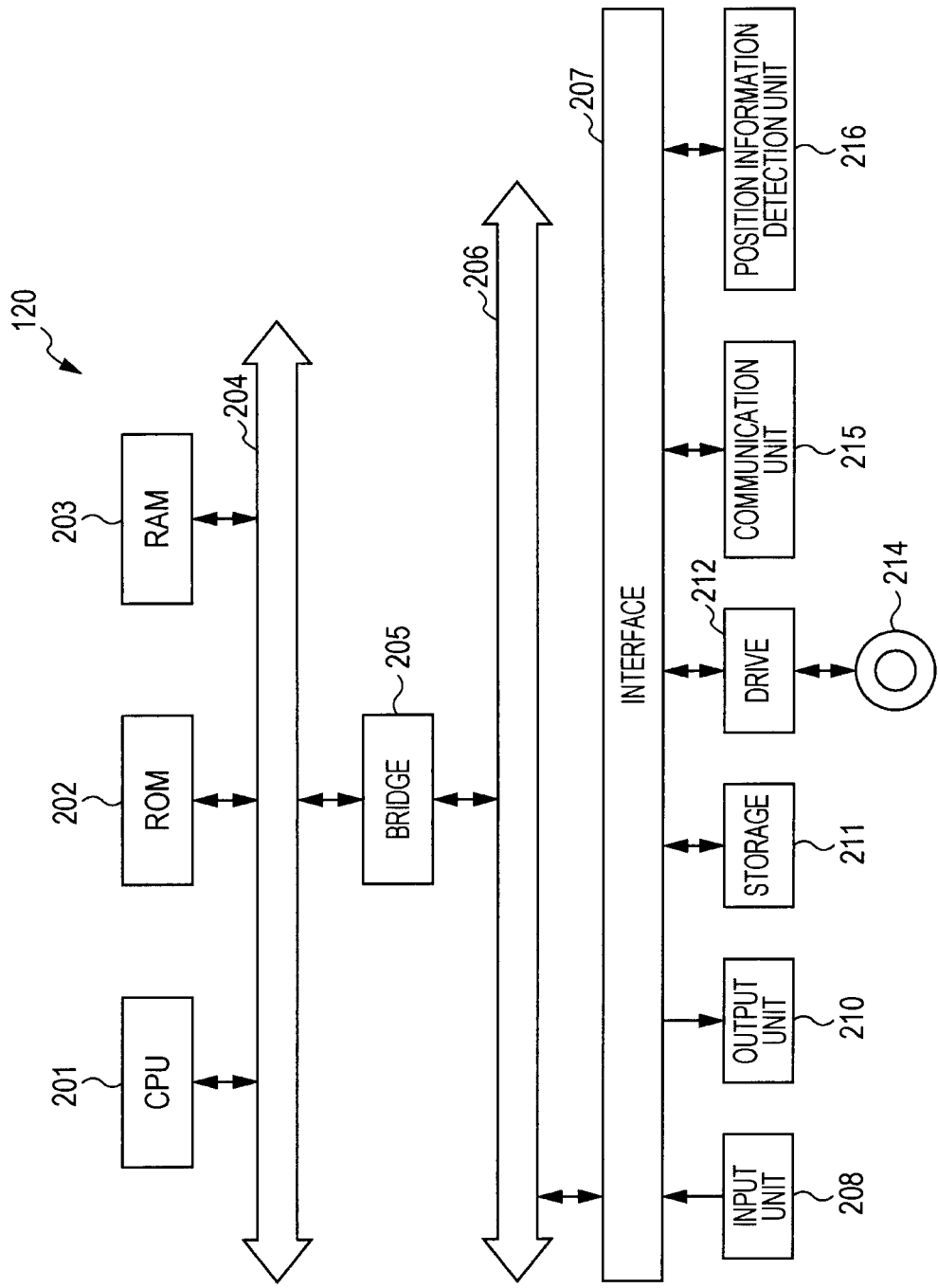
FIG. 2 is a diagram schematically illustrating an internal configuration example of the portable terminal which is operated in the communication system shown in FIG. 1.

FIG. 2 schematically shows an internal configuration example of the portable terminal 120 operated in the communication system shown in FIG. 1. Hereinafter, the respective parts thereof will be described.

A CPU (Central Processing Unit) 201 executes application programs in execution circumstances provided by an operating system (OS), and controls the overall operations in the portable terminal 120. The application programs described here may include a variety of applications such as mail messaging and a browser. A detection frequency of an important degree of position information, in other words, necessary position information is diversified for each application program.

A ROM (Read Only Memory) 202 permanently stores programs or operation parameters used by the CPU 201. A RAM (Random Access Memory) 203 is used as a work memory by loading a program to be used in execution of the CPU 201 thereto, or temporarily storing parameters which are appropriately varied. The CPU 201, the ROM 202, and the RAM 203 are connected to each other via a host bus 204 including a CPU bus or the like.

The host bus 204 is further connected to an external bus 206 such as a PCI (Peripheral Component Interconnect/Interface) bus via a bridge 205. In addition, the host bus 204, the bridge 205, and the external bus 206 are not necessarily configured separately from each other, but these functions may be mounted on a single bus.

An input unit 208 includes an input portion used for a user to input information, such as a mouse, a keyboard, a touch panel, a button, a microphone, a switch, and a lever, and an input control circuit which generates an input signal based on an input by a user and outputs the input signal to the CPU 201. A user of the portable terminal 120 can input a variety of data to the portable terminal 120 or instruct process operations by operating the input unit 208.

An output unit 210 includes a display device such as, for example, a liquid crystal display (LCD), an OLED (Organic Light Emitting Diode), and an LED. Further, the output unit 210 includes a voice output device such as a speaker and a headphone. The output unit 210 outputs, for example, reproduced content. Specifically, the display device displays and outputs a variety of information such as reproduced video data as texts or images. On the other hand, the voice output device converts reproduced voice data into voice and outputs the voice.

A storage 211 is a device for storing data and is an example of the storage unit of the portable terminal 120. The storage 211 may include a storage medium, a recording device recording data in the storage medium, a reading device reading data from the storage medium, and a deletion device deleting data recorded in the storage medium, and the like. The storage 211 may include, for example, a HDD (Hard Disk Drive), and install programs executed by the CPU 201 or store files of various kinds of data and the like, by driving a hard disk.

A drive 212 is a reader and writer for a storage medium, and is embedded inside or attached outside the portable terminal 120. The drive 212 reads information recorded on a removable recording medium 214 such as a magnetic disk, an optical disc, a magneto-optical disc, or a semiconductor memory, and outputs the information to the RAM 203.

The communication unit 215 is an interface for communication with external devices. The communication unit 215 may include a wireless communication function with the first base stations 130 and a wireless communication function with the second base stations 150. The communication unit 215 is assumed to correspond to a wireless multiple access method such as orthogonal frequency division multiple access (OFDMA), time division multiple access (TDMA) or code division multiple access (CDMA).

The position information detection unit 216 detects information for a current position of the portable terminal 120. In the embodiment, the position information detection unit 216 performs hybrid positioning by combining a plurality of position detection functions, such as a position detection function performed by a GPS receiver, and a position detection function of obtaining position information from information obtained via a plurality of public wireless base stations such as the first base stations 130 and the second base stations 150.

Figure 3:
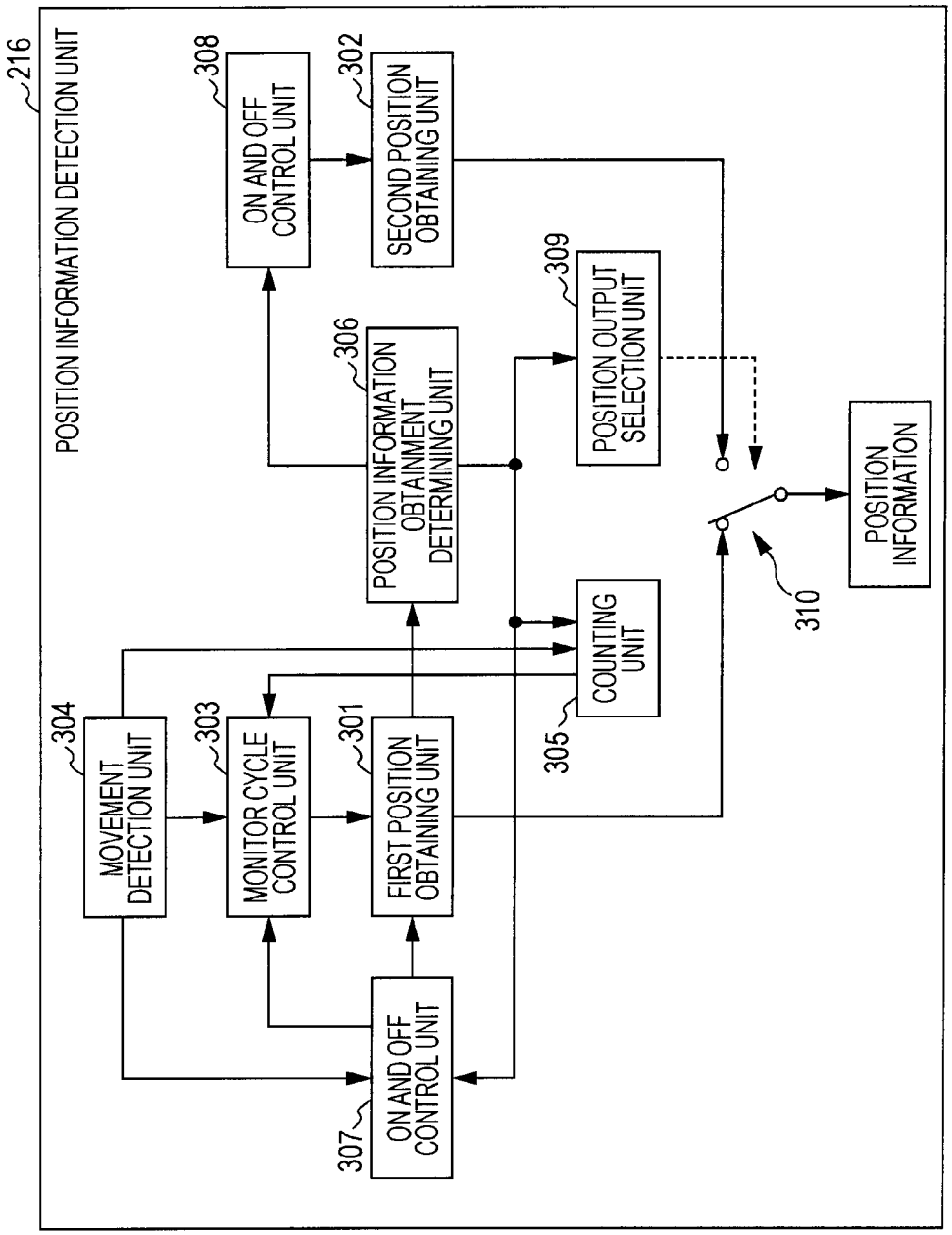
FIG. 3 is a diagram schematically illustrating an internal configuration example of the position information detection unit.

FIG. 3 schematically shows an internal configuration example of the position information detection unit 216. The shown position information detection unit 216 includes a first position information obtaining unit 301, a second position information obtaining unit 302, a monitor cycle control unit 303, a movement detection unit 304, a counting unit 305, a position information obtainment determining unit 306, a first ON and OFF state control unit 307 which controls ON and OFF states of the first position information obtaining unit 301, a second ON and OFF state control unit 308 which controls ON and OFF states of the second position information obtaining unit 302, a position output selection unit 309, and a switch 310. Hereinafter, the respective parts will be described.

The first position information obtaining unit 301 is a functional module which receives, for example, a GPS signal and obtains high accuracy position information. On the other hand, the second position information obtaining unit 302 is a portion for obtaining position information even at a point where first position information obtaining unit 301 is not able to obtain a GPS signal. As described later, the first position information obtaining unit 301 and the second position information obtaining unit 302 are used in a complementary manner.

For example, the second position information obtaining unit 302 detects a reception level of a signal from a plurality of peripheral public wireless base stations (Wi-Fi access points or 3G base stations), and detects a propagation loss based on a difference with a transmission level. A distance to a base station which is a transmission source can be calculated based on the carrier frequency and the propagation loss, and thus position information for the second position information obtaining unit 302 can be calculated using position information for each public wireless base station and the distance from each public wireless base station. In addition, in a case of a synchronous system, position information may be estimated by obtaining relative delay information of a signal from each public wireless base station.

However, the present disclosure is not limited to the specific position obtaining functions of the first position information obtaining unit 301 and the second position information obtaining unit 302. It is important for the first position information obtaining unit 301 to differ from the second position information obtaining unit 302 in terms of accuracy of position obtainment and an area where a position can be obtained. The first position information obtaining unit 301 can obtain position information with high accuracy, but is not able to obtain position information in an area such as an indoor location or a basement (is not able to receive a GPS signal), and has high power consumption. In contrast, the second position information obtaining unit 302 can obtain position information substantially in all areas, but has accuracy of position information which is not higher than the first position information obtaining unit 301.

The monitor cycle control unit 303 controls a monitor cycle of the first position information obtaining unit 301, that is, a frequency where the first position information obtaining unit 301 obtains position information. If a monitor cycle is shortened, that is, an obtaining frequency of position information is increased, the first position information obtaining unit 301 frequently obtains high accuracy position information but power consumption is increased. On the other hand, if the monitor cycle is lengthened, that is, the obtaining frequency of position information is reduced, the first position information obtaining unit 301 has a decreasing opportunity for obtaining high accuracy position information, but power consumption can be reduced.

In the embodiment, the monitor cycle control unit 303 controls the monitor cycle based on outputs from the movement detection unit 304 and the counting unit 305. The movement detection unit 304 detects whether or not the position information detection unit 216 (or the first position information obtaining unit 301) is moved.

The movement detection unit 304 detects that the first position information obtaining unit 301 is moved when there is a variation of a predetermined value or more in a position of the first position information obtaining unit 301. Further, if the movement detection unit 304 detects the movement of the first position information obtaining unit 301, the monitor cycle control unit 303 further shortens the monitor cycle such that the first position information obtaining unit 301 increases an obtaining frequency of position information. This is because a variation in a position is large and it is necessary to detect position information at a short cycle in frequent movement circumstances. On the other hand, if the movement detection unit 304 does not detect the movement of the first position information obtaining unit 301, the monitor cycle control unit 303 lengthens the monitor cycle such that the first position information obtaining unit 301 decreases the obtaining frequency of position information. This is because a variation in a position is small and position information can be obtained with sufficient accuracy even at a long cycle in infrequent movement circumstances.

In addition, when the movement detection unit 304 detects a movement of the first position information obtaining unit 301 again after temporarily lengthening the monitor cycle because the movement detection unit 304 does not detect a movement of the first position information obtaining unit 301, the counting unit 305 counts a time period where the movement detection unit 304 detects the movement of the position information detection unit 216. In addition, if the time period reaches a predetermined value (count 1), the monitor cycle control unit 303 returns the monitor cycle to a short monitor cycle such that the first position information obtaining unit 301 increases an obtaining frequency of position information again.

As such, if the movement detection unit 304 detects the movement of the first position information obtaining unit 301 again, the monitor cycle of the first position information obtaining unit 301 is not promptly changed, but is changed after the counting unit 305 counts the specific time period (count 1). Therefore, the counting unit 305 plays a part in stabilizing the state transition by giving hysteresis to the transitioned state where the first position information obtaining unit 301 changes the obtaining frequency of position information.

There are cases where the first position information obtaining unit 301 is not able to obtain position information in an area where a GPS signal is not able to be received such as an indoor location or a basement. The position information obtainment determining unit 306 determines whether or not the first position information obtaining unit 301 obtains position information.

If the position information obtainment determining unit 306 determines that the first position information obtaining unit 301 does not obtain position information, the second ON and OFF state control unit 308 controls the second position information obtaining unit 302 to enter an ON state such that the second position information obtaining unit 302 starts an obtaining process of position information. In other words, the second position information obtaining unit 302 can supplement obtaining of position information in an area where the first position information obtaining unit 301 is not able to obtain position information.

In addition, the counting unit 305 counts a time period where the position information obtainment determining unit 306 determines that the first position information obtaining unit 301 is not able to obtain position information. The monitor cycle control unit 303 controls a frequency where the first position information obtaining unit 301 obtains position information based on the time period. For example, if the first position information obtaining unit 301 is moved to a place where a GPS signal is not able to be received such as an indoor location or a basement, it is useless for the first position information obtaining unit 301 to frequently obtain position information despite not obtaining position information from the viewpoint of power consumption or the like. Therefore, the movement detection unit 304 detects a movement of the first position information obtaining unit 301, further the counting unit 305 counts a time period where the first position information obtaining unit 301 is not able to obtain position information, and if the time period exceeds a predetermined value (count 2), the monitor cycle control unit 303 lengthens a monitor cycle so as to reduce an obtaining frequency of position information by the first position information obtaining unit 301.

As such, if the first position information obtaining unit 301 is not able to obtain position information, a monitor cycle of the first position information obtaining unit 301 is not promptly changed, but is changed after the counting unit 305 counts the specific time period (count 2). Therefore, the counting unit 305 plays a part in stabilizing the state transition by giving a hysteresis to the transitioned state where the first position information obtaining unit 301 changes the obtaining frequency of position information.

In addition, when the movement detection unit 304 detects that the first position information obtaining unit 301 is not moved, and the position information obtainment determining unit 306 determines that the first position information obtaining unit 301 is not able to obtain position information, the first ON and OFF state control unit 307 controls the first position information obtaining unit 301 to enter an OFF state such that the obtaining process of position information stops. For example, in a case where the first position information obtaining unit 301 is present at a place where a GPS signal is not able to be received such as an indoor location or a basement and also is not moved, position information is not able to be obtained using the GPS receiver. For this reason, power consumption is made to be reduced by stopping an operation of the GPS receiver in the above condition that the first position information obtaining unit 301 is not able to obtain position information and also is not moved.

On the other hand, when the movement detection unit 304 detects a movement of the first position information obtaining unit 301 in a state where the first position information obtaining unit 301 enters the OFF state so as to stop the obtaining process, the first ON and OFF state control unit 307 controls the first position information obtaining unit 301 to enter an ON state such that the first position information obtaining unit 301 obtains position information again. For example, if the first position information obtaining unit 301 starts to be moved from a place where a GPS signal is not able to be received such as an indoor location or a basement, since the first position information obtaining unit 301 is moved to a place where a GPS signal may be received, high accuracy position information is tried to be obtained by resuming an operation of the first position information obtaining unit 301. In addition, the monitor cycle control unit 303 determines a monitor cycle when the first position information obtaining unit 301 resumes the position obtaining process. In the embodiment, a short monitor cycle is assumed to be set when the position obtaining process is resumed.

Here, if the position information obtainment determining unit 306 determines that the first position information obtaining unit 301 obtains position information when the second position information obtaining unit 302 is in an ON state, the second ON and OFF state control unit 308 controls the second position information obtaining unit 302 to enter an OFF state so as to stop the position information obtaining process. This is because if higher accuracy position information can be obtained by the first position information obtaining unit 301, it is not necessary for the second position information obtaining unit 302 to obtain position information.

The position output selection unit 309 determines which one of the first position information obtaining unit 301 and the second position information obtaining unit 302 obtains position information using the position information obtainment determining unit 306, and selects which one outputs the position information. In addition, when position information is obtained by both of the first position information obtaining unit 301 and the second position information obtaining unit 302, position information from the first position information obtaining unit 301 having higher accuracy is selected to be output. If the position information obtainment determining unit 306 determines that the first position information obtaining unit 301 obtains position information, the position output selection unit 309 may select an output from the first position information obtaining unit 301. In addition, if the position information obtainment determining unit 306 determines that the first position information obtaining unit 301 is not able to obtain position information, since the second ON and OFF state control unit 308 controls the second position information obtaining unit 302 to enter an ON state, the position output selection unit 309 may select an output from the second position information obtaining unit 302. In addition, there are cases where accuracy of position information obtained by the first position information obtaining unit 301 may be higher than accuracy of position information obtained by the second position information obtaining unit 302 for a specific time period from a state where the first position information obtaining unit 301 obtains position information shortly after the first position information obtaining unit 301 is transitioned to a state of not obtaining position information. Therefore, the position output selection unit 309 may output position information which is lastly obtained by the first position information obtaining unit 301 for the specific time period shortly after the first position information obtaining unit 301 is transitioned to a state of not obtaining position information. In addition, a length of the specific time period may be varied based on a movement distance detected by the movement detection unit 304.

The switch 310 controls which position information of the first position information obtaining unit 301 and the second position information obtaining unit 302 is output based on the result selected by the position output selection unit 309, thereby obtaining final position information.

Figure 4:
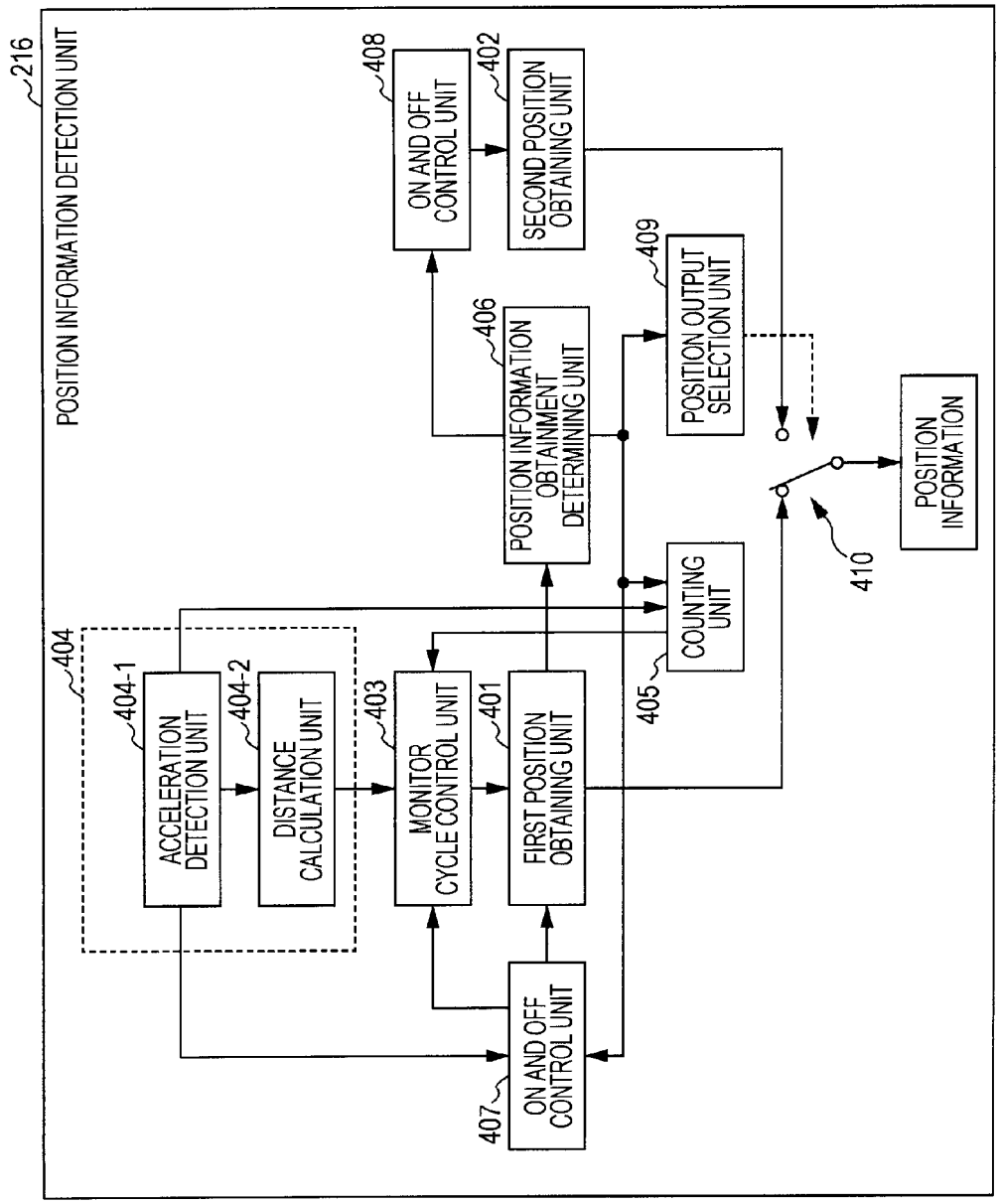
FIG. 4 is a diagram schematically illustrating another internal configuration example of the position information detection unit.

FIG. 4 schematically shows another internal configuration example of the position information detection unit 216. In a manner similar to FIG. 3, the shown position information detection unit 216 includes a first position information obtaining unit 401, a second position information obtaining unit 402, a monitor cycle control unit 403, a movement detection unit 404, a counting unit 405, a position information obtainment determining unit 406, a first ON and OFF state control unit 407 which controls ON and OFF states of the first position information obtaining unit 401, a second ON and OFF state control unit 408 which controls ON and OFF states of the second position information obtaining unit 402, a position output selection unit 409, and a switch 410. The respective functional modules 401 to 410 are operated basically in the same manner as the configuration example shown in FIG. 3. In the shown example, the movement detection unit 404 includes an acceleration detection unit 404-1 and a distance calculation unit 404-2. Hereinafter, the respective units will be described mainly based on a difference with FIG. 3.

The acceleration detection unit 404-1 detects acceleration caused by a movement of the first position obtaining unit 401. In addition, the distance calculation unit 404-2 calculates a movement distance by, for example, a motion with constant acceleration or a uniform motion, for a predetermined time, based on the acceleration detected by the acceleration detection unit 404-1.

The monitor cycle control unit 403 controls a monitor cycle of the first position information obtaining unit 401 based on the movement distance of the first position obtaining unit 401, calculated by the distance calculation unit 404-2. Here, the monitor cycle control unit 403 sets one or a plurality of threshold values, and controls a monitor cycle to be shortened, that is, such that the first position obtaining unit 401 increases a frequency of the obtaining process of position information, if a movement distance for a predetermined time exceeds the threshold value. In contrast, if the movement distance for the predetermined time is less than the threshold value, the monitor cycle control unit 403 controls the monitor cycle to be lengthened, that is, such that the first position obtaining unit 401 reduces a frequency of the obtaining process of position information.

In addition, the counting unit 405 plays a part in stabilizing the state transition by giving hysteresis to the monitor cycle, that is, the transitioned state where the first position obtaining unit 401 changes an obtaining frequency of position information (described above).

Further, the movement detection unit 404 may include an azimuth detection unit (not shown) in addition to the acceleration detection unit 404-1. In this case, it is possible to estimate position information by calculating movement information for the first position obtaining unit 401 based on position information which is lastly detected by the first position obtaining unit 401, using acceleration information obtained from the acceleration detection unit 404-1 and azimuth information obtained from the azimuth detection unit. When a GPS signal is not be received, and the first position obtaining unit 401 is not able to obtain position information, the position output selection unit 409 preferably selects information having higher accuracy of position information obtained using the acceleration information and the azimuth information, and the position information obtained by the second position information obtaining unit 402, so as to be output.

Figure 5:
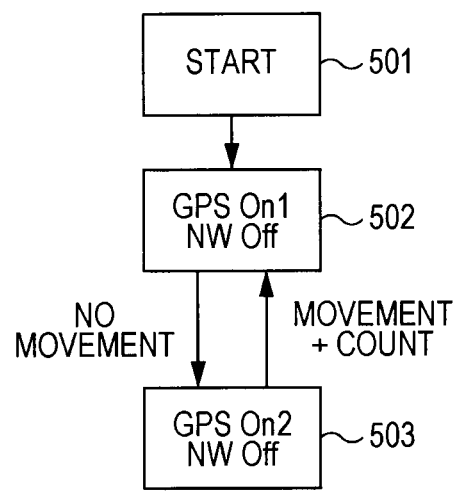
FIG. 5 is a diagram illustrating an example of the state transition flow in the position information detection unit shown in FIG. 3 or 4.

FIG. 5 shows an example of the state transition flow in the position information detection unit 216 shown in FIG. 3 or 4. In the same figure, "GPS On1" indicates a state of setting a short monitor cycle in the first position information obtaining unit 301, "GPS On2" indicates a state of setting a long monitor cycle in the first position information obtaining unit 301, "GPS Off" indicates that an obtaining process of position information by the first position information obtaining unit 301 is in an OFF state, "NW On" indicates that an obtaining process of position information by the second position information obtaining unit 302 is in an ON state, and "NW Off" indicates that an obtaining process of position information by the second position information obtaining unit 302 is in an OFF state (this is also true of the following).

If a position detection process by the position information detection unit 216 starts (501), first, the flow is transitioned to an obtaining process (502) of position information by the first position information obtaining unit 301. In this state, a short monitor cycle is set in the first position information obtaining unit 301 (GPS On1), and an operation of the second position information obtaining unit 302 stops (NW Off).

Here, if the position information obtainment determining unit 306 determines that the first position information obtaining unit 301 obtains position information, this state (502) is maintained.

In addition, if, in this state (502), the position information obtainment determining unit 306 determines that the first position information obtaining unit 301 obtains position information, and the movement detection unit 304 detects that the first position information obtaining unit 301 is not moved, the monitor cycle control unit 303 sets a long monitor cycle in the first position information obtaining unit 301 (GPS On2), and the flow is transitioned to a reduction process (503) of an obtaining frequency of position information. Since the first position information obtaining unit 301 is hardly moved, low power consumption is achieved by reducing a frequency of obtaining a position using a GPS signal. In this process (503) as well, the second position information obtaining unit 302 stops being operated (NW Off).

If, in the process (503), the movement detection unit 304 detects that the first position information obtaining unit 301 is moved again after detecting that the first position information obtaining unit 301 is not moved, the counting unit 305 counts a time period where the movement detection unit 304 detects the movement of the first position information obtaining unit 301. In addition, if the time period reaches a predetermined value (count 1), the flow returns to the process (502), where the monitor cycle control unit 303 returns the monitor cycle to a short monitor cycle (GPS On1) such that the first position information obtaining unit 301 increases an obtaining frequency of position information again.

Figure 6:
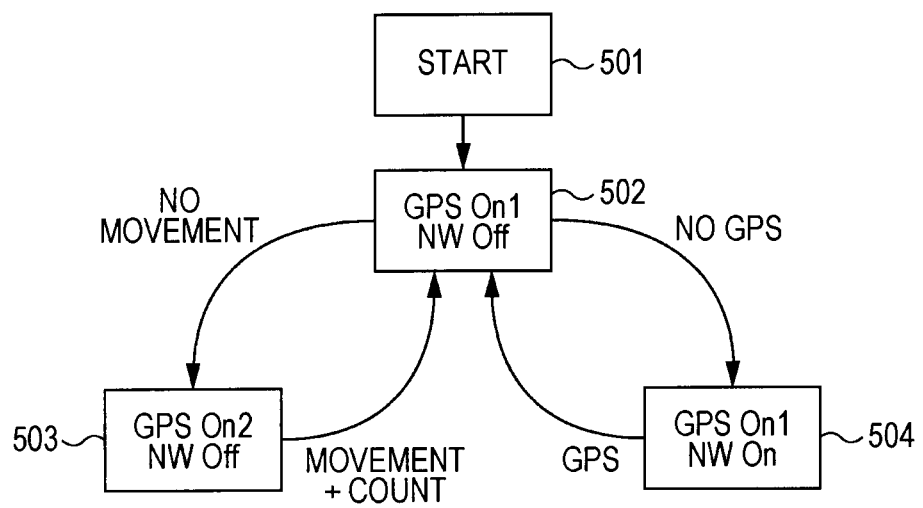
FIG. 6 is a diagram illustrating another example of the state transition flow in the position information detection unit shown in FIG. 3 or 4.

FIG. 6 shows another example of the state transition flow in the position information detection unit 216 shown in FIG. 3 or 4.

If a position detection process by the position information detection unit 216 starts (501), first, the flow is transitioned to an obtaining process (502) of position information by the first position information obtaining unit 301. In this state, a short monitor cycle is set in the first position information obtaining unit 301 (GPS On1), and an operation of the second position information obtaining unit 302 stops (NW Off).

Here, if the position information obtainment determining unit 306 determines that the first position information obtaining unit 301 obtains position information, this state (502) is maintained.

In addition, if, in this state (502), the position information obtainment determining unit 306 determines that the first position information obtaining unit 301 obtains position information, and the movement detection unit 304 detects that the first position information obtaining unit 301 is not moved, the monitor cycle control unit 303 sets a long monitor cycle in the first position information obtaining unit 301 (GPS On2), and the flow is transitioned to a reduction process (503) of an obtaining frequency of position information. Although the first position information obtaining unit 301 can receive a GPS signal, since the first position information obtaining unit 301 is hardly moved, low power consumption is achieved by reducing a frequency of obtaining a position using the GPS signal. In this process (503) as well, the second position information obtaining unit 302 stops being operated (NW Off).

If, in the process (503), the movement detection unit 304 detects that the first position information obtaining unit 301 is moved again after detecting that the first position information obtaining unit 301 is not moved, the counting unit 305 counts a time period where the movement detection unit 304 detects the movement of the first position information obtaining unit 301. In addition, if the time period reaches a predetermined value (count 1), the flow returns to the process (502), where the monitor cycle control unit 303 returns the monitor cycle to a short monitor cycle (GPS On1) such that the first position information obtaining unit 301 increases an obtaining frequency of position information again.

On the other hand, if, in the process (502), the position information obtainment determining unit 306 determines that the first position information obtaining unit 301 is not able to obtain position information, the flow is transitioned to a process (504) where the second position information obtaining unit 302 starts an operation of an obtaining process of position information (NW On) in addition to the obtaining process (GPS On1) of position information by the first position information obtaining unit 301, and the obtaining processes of position information by the first position information obtaining unit 301 and the second position information obtaining unit 302 are performed in parallel.

If, in the process (504), the position information obtainment determining unit 306 determines that the first position information obtaining unit 301 obtains position information, the operation of the obtaining process of position information by the second position information obtaining unit 302 stops (NW Off), and the flow returns to the process (502).

Figure 7:
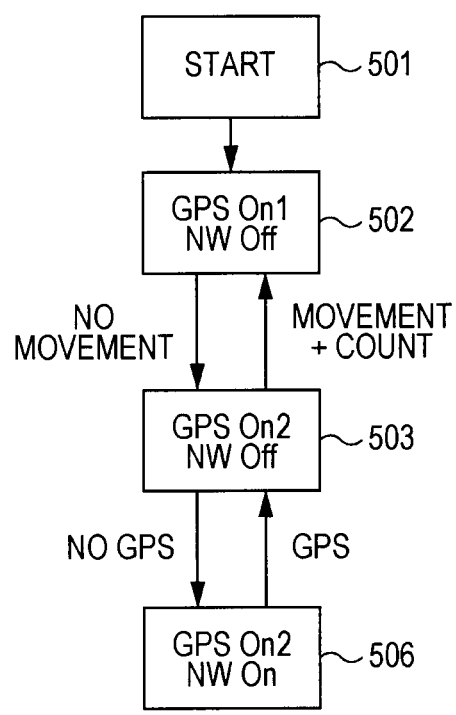
FIG. 7 is a diagram illustrating still another example of the state transition flow in the position information detection unit shown in FIG. 3 or 4.

FIG. 7 shows still another example of the state transition flow in the position information detection unit 216 shown in FIG. 3 or 4.

If a position detection process by the position information detection unit 216 starts (501), for example, the flow is transitioned to an obtaining process (502) of position information by the first position information obtaining unit 301. In this state, a short monitor cycle is set in the first position information obtaining unit 301 (GPS On1), and an operation of the second position information obtaining unit 302 stops (NW Off).

Here, if the position information obtainment determining unit 306 determines that the first position information obtaining unit 301 obtains position information, this state (502) is maintained.

In addition, if, in this state (502), the position information obtainment determining unit 306 determines that the first position information obtaining unit 301 obtains position information, and the movement detection unit 304 detects that the first position information obtaining unit 301 is not moved, the monitor cycle control unit 303 sets a long monitor cycle in the first position information obtaining unit 301 (GPS On2), and the flow is transitioned to a reduction process (503) of an obtaining frequency of position information. Although the first position information obtaining unit 301 can receive a GPS signal, since the first position information obtaining unit 301 is hardly moved, low power consumption is achieved by reducing a frequency of obtaining a position using the GPS signal. In this process (503) as well, the second position information obtaining unit 302 stops being operated (NW Off).

If, in the process (503), the movement detection unit 304 detects that the first position information obtaining unit 301 is moved again after detecting that the first position information obtaining unit 301 is not moved, the counting unit 305 counts a time period where the movement detection unit 304 detects the movement of the first position information obtaining unit 301. In addition, if the time period reaches a predetermined value (count 1), the flow returns to the process (502), where the monitor cycle control unit 303 returns a monitor cycle to a short monitor cycle (GPS On1) such that the first position information obtaining unit 301 increases an obtaining frequency of position information again.

If, in the process (503), the position information obtainment determining unit 306 determines that the first position information obtaining unit 301 is not able to obtain position information, the flow is transitioned to a process (506) where the monitor cycle control unit 303 sets a long monitor cycle (GPS On2) in the first position information obtaining unit 301, the second position information obtaining unit 302 starts an operation of an obtaining process of position information (NW On), and the obtaining processes of position information by the first position information obtaining unit 301 and the second position information obtaining unit 302 are performed in parallel.

If, in the process (506), the position information obtainment determining unit 306 determines that the first position information obtaining unit 301 obtains position information, the operation of the obtaining process of position information by the second position information obtaining unit 302 stops (NW Off), and the flow returns to the process (503).

Figure 8:
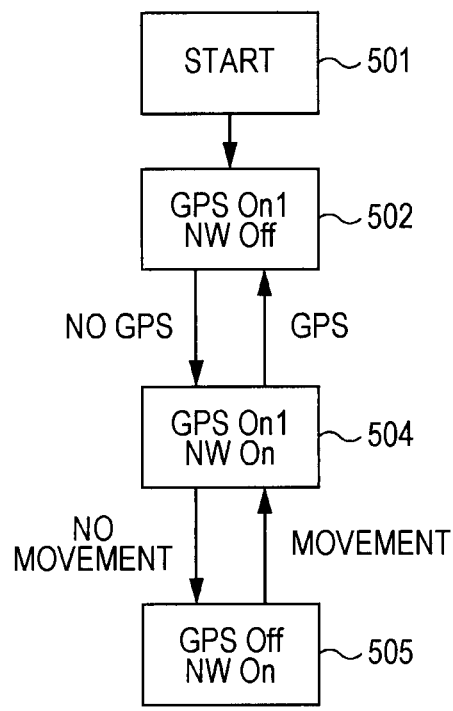
FIG. 8 is a diagram illustrating still another example of the state transition flow in the position information detection unit shown in FIG. 3 or 4.

FIG. 8 shows still another example of the state transition flow in the position information detection unit 216 shown in FIG. 3 or 4.

If a position detection process by the position information detection unit 216 starts (501), first, the flow is transitioned to an obtaining process (502) of position information by the first position information obtaining unit 301. In this state, a short monitor cycle is set in the first position information obtaining unit 301 (GPS On1), and an operation of the second position information obtaining unit 302 stops (NW Off).

Here, if the position information obtainment determining unit 306 determines that the first position information obtaining unit 301 obtains position information, this state (502) is maintained.

On the other hand, if, in the process (502), the position information obtainment determining unit 306 determines that the first position information obtaining unit 301 is not able to obtain position information, the flow is transitioned to a process (504) where the second position information obtaining unit 302 starts an operation of an obtaining process of position information (NW On) in addition to the obtaining process (GPS On1) of position information by the first position information obtaining unit 301, and the obtaining processes of position information by the first position information obtaining unit 301 and the second position information obtaining unit 302 are performed in parallel.

If, in the process (504), the position information obtainment determining unit 306 determines that the first position information obtaining unit 301 obtains position information, the operation of the obtaining process of position information by the second position information obtaining unit 302 stops (NW Off), and the flow returns to the process (502).

In addition, if, in the process (504), the movement detection unit 304 further detects that the first position information obtaining unit 301 is not moved, the flow is transitioned to a process (505) where the first position information obtaining unit 301 enters an OFF state (GPS Off), and only the second position information obtaining unit 302 performs an obtaining process of position information. There is little possibility that the first position information obtaining unit 301 may be varied to a state of being capable of receiving a GPS signal in a state of being incapable of receiving the GPS signal and of also not being moved. Therefore, low power consumption is achieved by stopping obtaining a position using the GPS signal.

If, in the process (505), the movement detection unit 304 detects a movement of the first position information obtaining unit 301, the flow returns to the process (504) where the first position information obtaining unit 301 enters on an ON state (GPS On1), and the obtaining processes of position information by the first position information obtaining unit 301 and the second position information obtaining unit 302 are performed in parallel.

Figure 9:
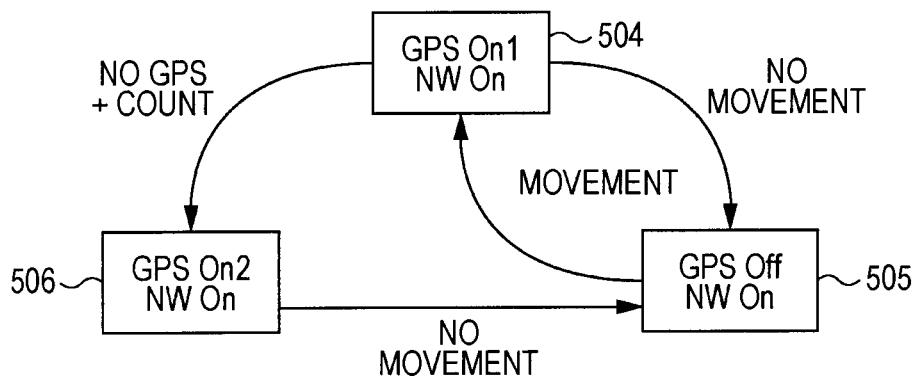
FIG. 9 is a diagram illustrating still another example of the state transition flow in the position information detection unit shown in FIG. 3 or 4.

FIG. 9 shows still another example of the state transition flow in the position information detection unit 216 shown in FIG. 3 or 4.

If the position information obtainment determining unit 306 determines that the first position information obtaining unit 301 does not obtain position information, and the movement detection unit 304 detects a movement of the first position information obtaining unit 301, there is a possibility that a GPS signal may be received according to the movement and thereby the first position information obtaining unit 301 may obtain position information. Therefore, the flow enters a state (504) where the second position information obtaining unit 302 starts an operation of an obtaining process of position information (NW On) in addition to the obtaining process (GPS On1) of position information by the first position information obtaining unit 301, and the obtaining processes of position information by the first position information obtaining unit 301 and the second position information obtaining unit 302 are performed in parallel.

If, in this state (504), the movement detection unit 304 detects that the first position information obtaining unit 301 is not moved, there is little possibility that the first position information obtaining unit 301 may be varied to a state of being capable of receiving a GPS signal. Therefore, the flow is transitioned to a process (505) where the first position information obtaining unit 301 enters an OFF state (GPS Off), and only the second position information obtaining unit 302 performs an obtaining process of position information.

If, in the process (504), the movement detection unit 304 detects a movement of the first position information obtaining unit 301, the position information obtainment determining unit 306 determines that the first position information obtaining unit 301 is not able to obtain position information, the counting unit 305 counts a time period where the first position information obtaining unit 301 is not able to obtain position information, and the time period exceeds a predetermined value (count 2), the flow is transitioned to a process (506) where the monitor cycle control unit 303 sets a long monitor cycle (GPS On2) in the first position information obtaining unit 301, and the obtaining processes of position information by the first position information obtaining unit 301 and the second position information obtaining unit 302 are performed in parallel. Since it is not able to be expected that a GPS signal can be received even if the first position information obtaining unit 301 is moved, low power consumption is achieved by reducing a frequency of obtaining a position using the GPS signal.

In addition, if, in the process (506), the first position information obtaining unit 301 is not able to obtain position information but the movement detection unit 304 also detects that the first position information obtaining unit 301 is not moved, the flow is transitioned to a process (505) where the first position information obtaining unit 301 enters an OFF state, and only the second position information obtaining unit 302 performs an obtaining process of position information. Since there is little possibility that the first position information obtaining unit 301 may be varied to a state of being capable of receiving a GPS signal in a state of not being moved, low power consumption is achieved by stopping obtaining a position using the GPS signal.

Figure 10:
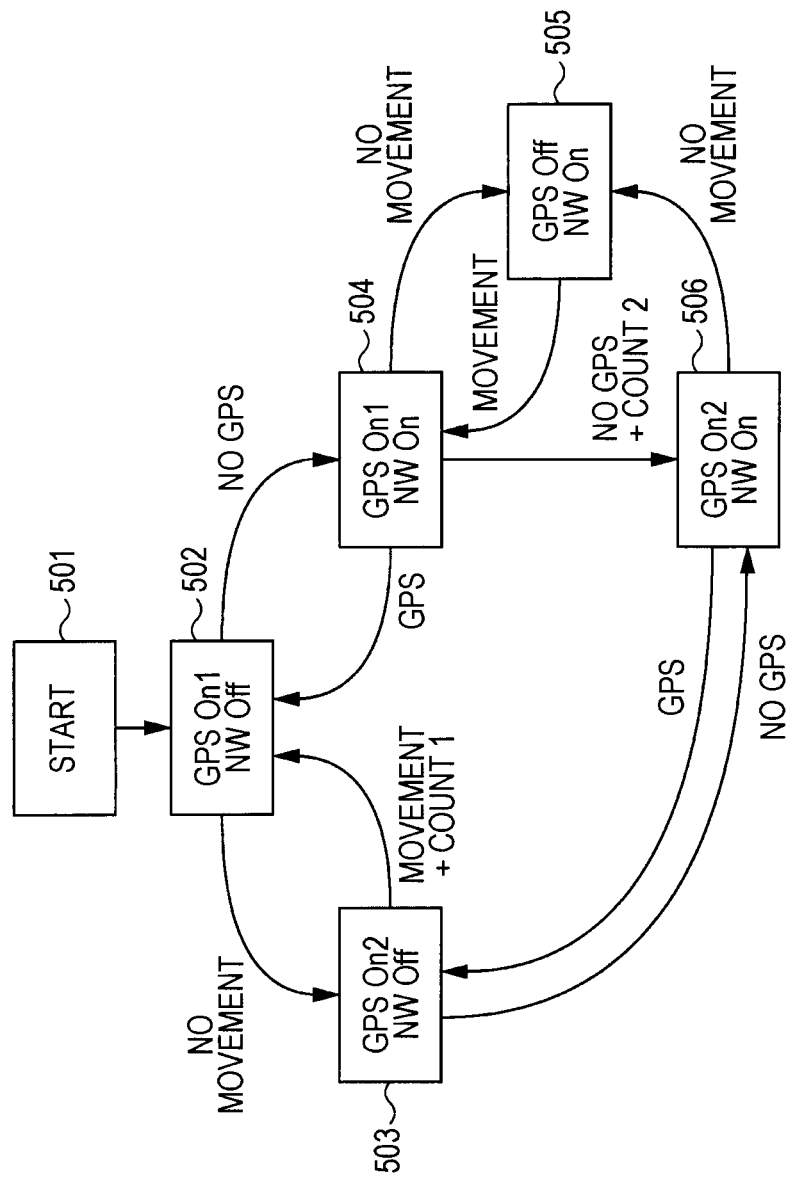
FIG. 10 is a diagram illustrating still another example of the state transition flow in the position information detection unit shown in FIG. 3 or 4.

In addition, FIG. 10 shows still another example of the state transition flow in the position information detection unit 216 shown in FIG. 3 or 4.

If a position detection process by the position information detection unit 216 starts (501), first, the flow is transitioned to an obtaining process (502) of position information by the first position information obtaining unit 301. In this state, a short monitor cycle is set in the first position information obtaining unit 301 (GPS On1), and an operation of the second position information obtaining unit 302 stops (NW Off).

Here, if the position information obtainment determining unit 306 determines that the first position information obtaining unit 301 obtains position information, this state (502) is maintained.

In addition, if, in this state (502), the position information obtainment determining unit 306 determines that the first position information obtaining unit 301 obtains position information, and the movement detection unit 304 detects that the first position information obtaining unit 301 is not moved, the monitor cycle control unit 303 sets a long monitor cycle in the first position information obtaining unit 301 (GPS On2), and the flow is transitioned to a reduction process (503) of an obtaining frequency of position information. In this process as well, the second position information obtaining unit 302 stops being operated (NW Off).

If, in the process (503), the movement detection unit 304 detects that the first position information obtaining unit 301 is moved again after detecting that the first position information obtaining unit 301 is not moved, the counting unit 305 counts a time period where the movement detection unit 304 detects the movement of the first position information obtaining unit 301. In addition, if the time period reaches a predetermined value (count 1), the flow returns to the process (502), where the monitor cycle control unit 303 returns a monitor cycle to a short monitor cycle (GPS On1) such that the first position information obtaining unit 301 increases an obtaining frequency of position information again.

As such, the transitioned state where the first position information obtaining unit 301 changes an obtaining frequency of position information is made to have hysteresis by changing a monitor cycle of the first position information obtaining unit 301 after the counting unit 305 counts the specific time period (count 1), and thereby it is possible to prevent a transition between the process (502) and the process (503) from being generated at a very high frequency.

On the other hand, if, in the process (502), the position information obtainment determining unit 306 determines that the first position information obtaining unit 301 is not able to obtain position information, the flow is transitioned to a process (504) where the second position information obtaining unit 302 starts an operation of an obtaining process of position information (NW On) in addition to the obtaining process (GPS On1) of position information by the first position information obtaining unit 301, and the obtaining processes of position information by the first position information obtaining unit 301 and the second position information obtaining unit 302 are performed in parallel.

If, in the process (504), the position information obtainment determining unit 306 determines that the first position information obtaining unit 301 obtains position information, the operation of the obtaining process of position information by the second position information obtaining unit 302 stops (NW Off), and the flow returns to the process (502).

In addition, if, in the process (504), the movement detection unit 304 further detects that the first position information obtaining unit 301 is not moved, the flow is transitioned to a process (505) where the first position information obtaining unit 301 enters an OFF state (GPS Off), and only the second position information obtaining unit 302 performs an obtaining process of position information.

If, in the process (505), the movement detection unit 304 detects a movement of the first position information obtaining unit 301, the flow returns to the process (504) where the first position information obtaining unit 301 enters an ON state (GPS On1), and the obtaining processes of position information by the first position information obtaining unit 301 and the second position information obtaining unit 302 are performed in parallel.

If, in the process (504), the movement detection unit 304 detects a movement of the first position information obtaining unit 301, the position information obtainment determining unit 306 determines that the first position information obtaining unit 301 is not able to obtain position information, the counting unit 305 counts a time period where the first position information obtaining unit 301 is not able to obtain position information, and the time period exceeds a predetermined value (count 2), the flow is transitioned to a process (506) where the monitor cycle control unit 303 sets a long monitor cycle (GPS On2) in the first position information obtaining unit 301, and the obtaining processes of position information by the first position information obtaining unit 301 and the second position information obtaining unit 302 are performed in parallel.

As such, the transitioned state where the first position information obtaining unit 301 changes an obtaining frequency of position information is made to have hysteresis by changing a monitor cycle of the first position information obtaining unit 301 after the counting unit 305 counts the specific time period (count 2), and thereby it is possible to prevent the transition between the process (504) and the process (505) from being generated at a very high frequency.

If, in the process (506), the first position information obtaining unit 301 is not able to obtain position information but the movement detection unit 304 also detects that the first position information obtaining unit 301 is not moved, the flow is transitioned to a process (505) where the first position information obtaining unit 301 enters an OFF state, and only the second position information obtaining unit 302 performs an obtaining process of position information.

On the other hand, if, in the process (506), the position information obtainment determining unit 306 determines that the first position information obtaining unit 301 obtains position information, the flow is transitioned to the above-described process (503) where the second position information obtaining unit 302 stops the operation of the obtaining process of position information (NW Off).

In addition, if, in the process (503), the position information obtainment determining unit 306 determines that the first position information obtaining unit 301 is not able to obtain position information, the flow returns to a process (506) where the monitor cycle control unit 303 sets a long monitor cycle (GPS On2) in the first position information obtaining unit 301, and the obtaining processes of position information by the first position information obtaining unit 301 and the second position information obtaining unit 302 are performed in parallel.

Further, in the state transitions shown in FIGS. 5 to 10, an initial value (GPS On1) of the monitor cycle when the first position information obtaining unit 301 starts an obtaining process of position information is not unique. For example, although various application programs including mail messaging and a browser are executed on the portable terminal 120, an important degree of the position information, that is, a detection frequency of necessary position information is diversified for each application program. Therefore, the monitor cycle control unit 303 may have a structure where the initial value (GPS On1) is changed depending on an application program during activation on the portable terminal 120.

FIG. 13 shows a structure where the initial value (GPS On1) of the monitor cycle is switched depending on an application program during activation on the portable terminal 120, included in the monitor cycle control unit 303.

Since an application program such as a navigation which guides a user during movement to a destination or a life log which stores behavior of a person (life) in a log as digital data is very sensitive to position information, the monitor cycle control unit 303 sets an initial value (GPS On1_1) of the shortest monitor cycle when this kind of application program is activated.

In addition, since accurate position information is necessary for an application program for obtaining (described later and refer to FIG. 11) wireless parameters correlated with position information although not to the degree of the life log, the monitor cycle control unit 303 sets an initial value (GPS On1_2) of a relatively short monitor cycle.

On the other hand, since an application program for checking a user at home hardly uses position information, the monitor cycle control unit 303 may set an initial value (GPS On1_N) of a relatively long monitor cycle, thereby preferentially reducing power consumption.

Figure 11:
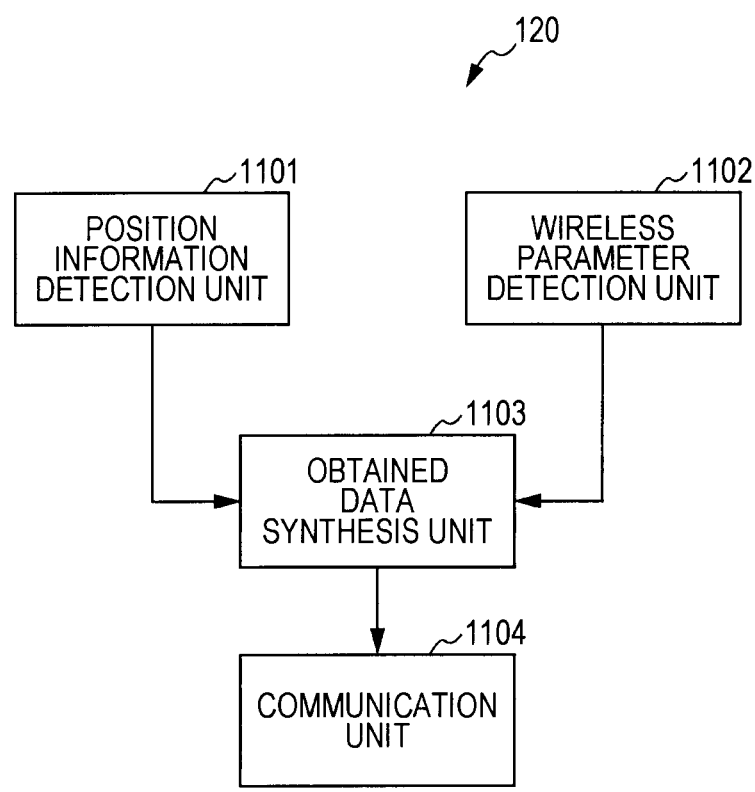
FIG. 11 is a diagram illustrating an example of the functional configuration of the portable terminal including the position information detection unit.

FIG. 11 shows an example of the functional configuration of the portable terminal 120 including the position information detection unit. In the shown example, the portable terminal 120 includes a position information detection unit 1101, a wireless parameter detection unit 1102, an obtained data synthesis unit 1103, and a communication unit 1104, as functional modules.

The position information detection unit 1101 has the configuration shown in FIG. 3 or 4. That is to say, the position information detection unit 1101 performs hybrid positioning using the first position information obtaining unit 301 and the second position information obtaining unit 302, and, as described above, operates the first position information obtaining unit 301 and the second position information obtaining unit 302 in a complementary manner based on a reception state of a GPS signal and a movement state of the first position information obtaining unit 301, thereby achieving low power consumption and obtaining higher accuracy position information.

The wireless parameter detection unit 1102 and the communication unit 1104 correspond to the communication unit 215 shown in FIG. 2. The communication unit 1104 is wirelessly connected to peripheral base stations and communicates other portable terminals. In addition, the wireless parameter detection unit 1102 detects wireless parameters when the communication unit 1104 receives signals from a plurality of peripheral public wireless base stations.

The communication unit 1104 corresponds to a wireless multiple access method such as orthogonal frequency division multiple access (OFDMA), time division multiple access (TDMA) or code division multiple access (CDMA) (described above). Therefore, the wireless parameters detected by the wireless parameter detection unit 1102 may include the following.

(1) A reception level of a pilot signal obtained by correlation detection of scramble codes allocated to one or a plurality of base stations corresponding to the code division multiple access method, numerical values calculated from pilot signals received from a plurality of base stations, information regarding the state of congestion of a base station, or an expected value of a communication rate of a base station.

(2) Information regarding a ratio of the number of sub-carriers allocated to a user with respect to a total number of sub-carriers for each frame, included in signals received from one or a plurality of base stations corresponding to the orthogonal frequency division multiple access method, information regarding a traffic situation of each base station, information regarding a ratio of the number of sub-carriers allocated to a user with respect to a total number of sub-carriers for each frame, information regarding the state of congestion of a base station, or an expected value of a communication rate of a base station.

Here, a ratio of the number of sub-carriers allocated by each user with respect to a total number of sub-carriers for each frame can be obtained by receiving, demodulating, and decoding a control signal included in a signal received from a public wireless station. For example, a method for obtaining wireless parameters is disclosed in Japanese Patent Application No. 2010-142384 which has already been assigned to the present applicant.

The obtained data synthesis unit 1103 correlates the wireless parameters detected by the wireless parameter detection unit 1102 with position information and time information detected by the position information detection unit 1101 at the time of the detection thereof. In addition, the communication unit 1104 may transmit data created by the obtained data synthesis unit 1103 to an arbitrary server at an arbitrary timing. The server side can grasp a traffic situation at each point by collecting the wireless parameters correlated with the position information and the time information from a plurality of portable terminals, and perform a service such as sending a notification of the traffic situation to each portable terminal.

FIG. 12 schematically shows a configuration example of the communication system 1200 including a portable terminal which obtains position information and detects wireless parameters and a server which collects the wireless parameters from the portable terminal.

In the shown example, the portable terminal 120 includes a position information detection unit 1201, a wireless parameter detection unit 1202, an obtained data synthesis unit 1203, a communication unit 1204, and a public wireless network setting unit 1205 as functional modules.

The position information detection unit 1201 includes the configuration shown in FIG. 3 or 4 and performs hybrid positioning.

The wireless parameter detection unit 1202 and the communication unit 1204 correspond to the communication unit 215 shown in FIG. 2. The communication unit 1204 is wirelessly connected to peripheral base stations and communicates other portable terminals. In addition, the wireless parameter detection unit 1202 detects wireless parameters when the communication unit 1204 receives signals from a plurality of peripheral public wireless base stations (described above).

The obtained data synthesis unit 1203 correlates the wireless parameters detected by the wireless parameter detection unit 1202 with position information and time information detected by the position information detection unit 1201 at the time of the detection thereof.

The communication unit 1204 includes a transmission unit 1204-1 and a reception unit 1204-2. The transmission unit 1204-1 may transmit data created by the obtained data synthesis unit 1203 to a server 1230 at an arbitrary timing.

The server 1230 includes a wireless parameter analysis unit 1231, collects wireless parameters correlated with position information and time information from a plurality of portable terminals, analyzes the wireless parameters using the wireless parameter analysis unit 1231, and evaluates one or a plurality of public wireless base stations which are located around the portable terminal which is a transmission source of each wireless parameter. For example, the wireless parameter analysis unit 1231 may rank a plurality of public wireless base stations (telecommunications carriers) present around a position of each portable terminal, a carrier frequency, a frequency bandwidth, and a wireless method based on the state of congestion or the expected value of a communication rate, through the analysis of the wireless parameters. The wireless parameter analysis unit 1231 may use communication expenses for each base station (telecommunications carrier) as an index at the time of the ranking. In addition, the server 1230 feeds back the estimated result to each portable terminal.

If the reception unit 1214-2 receives the estimated result from the server 1230, the portable terminal 120 enables the public wireless network setting unit 1215 to select a public wireless network to be used, and set a carrier frequency, a frequency bandwidth, a wireless method, and the like, based on the evaluation result.

As above, the present disclosure has been described in detail using the specific embodiment. However, it is obvious that a person skilled in the art can modify or alter the embodiment without departing from the scope of the present disclosure.

In the present specification, although the embodiment where the function module receiving a GPS signal and obtaining high accuracy position information is used in the first position obtaining unit, and the functional module obtaining position information based on electric measurement information from a plurality of public wireless base stations is used in the second position obtaining unit has been described, the spirit of the present disclosure is not limited to the specified position obtaining functions of the first position obtaining unit and the second position obtaining unit. The present disclosure is applicable to a position detection device which performs hybrid positioning by combining various position obtaining functions where position obtaining accuracy and areas capable of obtaining positions are different from each other.

The present disclosure contains subject matter related to that disclosed in Japanese Priority Patent Application JP 2010-252412 filed in the Japan Patent Office on Nov. 11, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A position detection device comprising:
   a first position obtaining unit that obtains position information by receiving a GPS (Global Positioning System) signal;
   a second position obtaining unit that obtains position information based on information obtained from a plurality of peripheral base stations;
   a position information obtainment determining unit that determines whether or not the first position obtaining unit obtains position information;
   a movement detection unit that detects a movement of the first position obtaining unit;
   a first ON and OFF state control unit that controls ON and OFF states of the first position obtaining unit based on a result detected by the movement detection unit or a result determined by the position information obtainment determining unit;
   a second ON and OFF state control unit that controls ON and OFF states of the second position obtaining unit based on a result determined by the position information obtainment determining unit;
   a monitor cycle control unit that controls a monitor cycle that the first position obtaining unit obtains position information based on a result detected by the movement detection unit or a result determined by the position information obtainment determining unit; and
   an output unit that selects and outputs one of two pieces of position information obtained by the first position obtaining unit and the second position obtaining unit.

2. The position detection device according to claim 1, wherein the monitor cycle control unit shortens the monitor cycle if the movement detection unit detects that the first position obtaining unit is moved, and lengthens the monitor cycle if the movement detection unit detects that the first position obtaining unit is not moved.

3. The position detection device according to claim 2, further comprising a counting unit that counts a time period where the movement detection unit detects a movement of the first position obtaining unit if the movement detection unit detects the movement of the first position obtaining unit again after the first position obtaining unit is detected as not being moved,
   wherein the monitor cycle control unit returns the monitor cycle to a short monitor cycle after the counting unit counts a first predetermined time period.

4. The position detection device according to claim 1, wherein the second ON and OFF state control unit makes the second position obtaining unit enter an ON state if the position information obtainment determining unit determines that the first position obtaining unit is not able to obtain position information.

5. The position detection device according to claim 1, further comprising a counting unit that counts a time period where the position information obtainment determining unit determines that the first position obtaining unit is not able to obtain position information,
   wherein the monitor cycle control unit lengthens the monitor cycle after the counting unit counts a second predetermined time period.

6. The position detection device according to claim 5, wherein the first ON and OFF state control unit makes the first position obtaining unit enter an OFF state if the movement detection unit detects that the first position obtaining unit is not moved in a state where the long monitor cycle is set.

7. The position detection device according to claim 1, wherein the first ON and OFF state control unit makes the first position obtaining unit enter an OFF state if the movement detection unit detects that the first position obtaining unit is not moved, and the position information obtainment determining unit determines that the first position obtaining unit is not able to obtain position information.

8. The position detection device according to claim 7, wherein the first ON and OFF state control unit makes the first position obtaining unit enter an ON state in response to the movement detection unit detecting a movement of the first position obtaining unit when the first position obtaining unit is in an OFF state.

9. The position detection device according to claim 1, wherein the second ON and OFF state control unit makes the second position obtaining unit enter an OFF state in response to the position information obtainment determining unit determining that the first position obtaining unit can obtain position information when the second position obtaining unit is in an ON state.

10. The position detection device according to claim 1, wherein the movement detection unit includes an acceleration detection unit that detects acceleration caused by a movement of the first position obtaining unit and a distance calculation unit that calculates a movement distance of the first position obtaining unit for a predetermined time based on the acceleration detected by the acceleration detection unit, and
wherein the monitor cycle control unit controls the monitor cycle based on the movement distance calculated by the distance calculation unit.

11. The position detection device according to claim 10, wherein the monitor cycle control unit has one or a plurality of threshold values, and performs a control such that the monitor cycle is shortened if the movement distance exceeds each threshold value, and the monitor cycle is lengthened if the movement distance is less than each threshold value.

12. A position detection device comprising:
a first position obtaining unit that obtains position information by receiving a GPS signal;
a second position obtaining unit that obtains position information based on information obtained from a plurality of peripheral base stations;
a position information obtainment determining unit that determines whether or not the first position obtaining unit obtains position information;
a movement detection unit that detects a movement of the first position obtaining unit;
an ON and OFF state control unit that controls ON and OFF states of the second position obtaining unit based on a result determined by the position information obtainment determining unit;
a monitor cycle control unit that controls a monitor cycle that the first position obtaining unit obtains position information based on a result detected by the movement detection unit or a result determined by the position information obtainment determining unit; and
an output unit that selects and outputs one of two pieces of position information obtained by the first position obtaining unit and the second position obtaining unit,
wherein the monitor cycle control unit lengthens the monitor cycle if the movement detection unit detects that the first position obtaining unit is not moved, and shortens the monitor cycle if a time period again the movement detection unit again detects a movement of the first position obtaining unit reaches a predetermined value, and
wherein the ON and OFF state control unit makes the second position obtaining unit enter an ON state if the position information obtainment determining unit determines that the first position obtaining unit is not able to obtain position information, and makes the second position obtaining unit enter an OFF state in response to the position information obtainment determining unit determining that the first position obtaining unit can obtain position information when the second position obtaining unit is in the ON state.

13. A position detection device comprising:
a first position obtaining unit that obtains position information by receiving a GPS signal;
a second position obtaining unit that obtains position information based on information obtained from a plurality of peripheral base stations;
a position information obtainment determining unit that determines whether or not the first position obtaining unit obtains position information;
a movement detection unit that detects a movement of the first position obtaining unit;
an ON and OFF state control unit that controls ON and OFF states of the second position obtaining unit based on a result determined by the position information obtainment determining unit;
a monitor cycle control unit that controls a monitor cycle that the first position obtaining unit obtains position information based on a result detected by the movement detection unit or a result determined by the position information obtainment determining unit; and
an output unit that selects and outputs one of two pieces of position information obtained by the first position obtaining unit and the second position obtaining unit,
wherein the monitor cycle control unit lengthens the monitor cycle if the movement detection unit detects that the first position obtaining unit is not moved, and shortens the monitor cycle if a time period where the movement detection unit again detects a movement of the first position obtaining unit reaches a predetermined value, and
wherein the ON and OFF state control unit makes the second position obtaining unit enter an ON state if the position information obtainment determining unit determines that the first position obtaining unit is not able to obtain position information in a case where the short monitor cycle is set, and makes the second position obtaining unit enter an OFF state in response to the position information obtainment determining unit determining that the first position obtaining unit can obtain position information when the second position obtaining unit is in the ON state.

14. A position detection device comprising:
a first position obtaining unit that obtains position information by receiving a GPS signal;
a second position obtaining unit that obtains position information based on information obtained from a plurality of peripheral base stations;
a position information obtainment determining unit that determines whether or not the first position obtaining unit obtains position information;
a movement detection unit that detects a movement of the first position obtaining unit;
a first ON and OFF state control unit that controls ON and OFF states of the first position obtaining unit based on a result detected by the movement detection unit or a result determined by the position information obtainment determining unit;
a second ON and OFF state control unit that controls ON and OFF states of the second position obtaining unit based on a result determined by the position information obtainment determining unit; and
an output unit that selects and outputs one of two pieces of position information obtained by the first position obtaining unit and the second position obtaining unit,
wherein the second ON and OFF state control unit makes the second position obtaining unit enter an ON state if the position information obtainment determining unit determines that the first position obtaining unit is not able to obtain position information, and makes the second position obtaining unit enter an OFF state in response to the position information obtainment determining unit determining that the first position obtaining unit can obtain position information when the second position obtaining unit is in the ON state, and wherein the first ON and OFF state control unit makes the first position obtaining unit enter an OFF state if the movement detection unit detects that the first position obtaining unit is not moved, and the position information obtainment determining unit determines that the first position obtaining unit is not able to obtain position information in a case where the second position obtaining unit is in an ON state, and the first ON and OFF state control unit makes the first position obtaining unit enter an ON state in response to the movement detection unit detecting a movement of the first position obtaining unit when the first position obtaining unit is in the OFF state.

15. A position detection device comprising:
a first position obtaining unit that obtains position information by receiving a GPS signal;
a second position obtaining unit that obtains position information based on information obtained from a plurality of peripheral base stations in a normally ON state;
a position information obtainment determining unit that determines whether or not the first position obtaining unit obtains position information;
a movement detection unit that detects a movement of the first position obtaining unit;
a first ON and OFF state control unit that controls ON and OFF states of the first position obtaining unit based on a result detected by the movement detection unit or a result determined by the position information obtainment determining unit;
a monitor cycle control unit that controls a monitor cycle that the first position obtaining unit obtains position information based on a result detected by the movement detection unit or a result determined by the position information obtainment determining unit; and
an output unit that selects and outputs one of two pieces of position information obtained by the first position obtaining unit and the second position obtaining unit,
wherein the first ON and OFF state control unit makes the first position obtaining unit enter an OFF state if the movement detection unit detects that the first position obtaining unit is not moved, and the position information obtainment determining unit determines that the first position obtaining unit is not able to obtain position information in a case where the monitor cycle is short, the first ON and OFF state control unit makes the first position obtaining unit enter an ON state in response to the movement detection unit detecting a movement of the first position obtaining unit when the first position obtaining unit is in the OFF state, thereby obtaining a position at the short monitor cycle, and the first ON and OFF state control unit makes the first position obtaining unit enter an OFF state if the movement detection unit detects that the first position obtaining unit is not moved in a case where the monitor cycle is long, and
wherein the monitor cycle control unit lengthens the monitor cycle if a time period where the movement detection unit does not again detect a movement of the first position obtaining unit reaches a predetermined value.

16. A communication apparatus comprising:
the position detection device according to claim 1;
a communication unit that is wirelessly connected to any of a plurality of peripheral base stations and performs communication;
a wireless parameter detection unit that detects wireless parameters when the communication unit receives signals from the plurality of base stations; and
an obtained data analysis unit that correlates the wireless parameters detected by the wireless parameter detection unit with position information and time information detected by the position detection device,
wherein data created by the obtained data analysis unit is transmitted from the communication unit.

17. A communication system comprising:
one or more communication apparatuses including the position detection device according to claim 1, a communication unit that is wirelessly connected to any of a plurality of peripheral base stations and performs communication, a wireless parameter detection unit that detects wireless parameters when the communication unit receives signals from the plurality of base stations, an obtained data analysis unit that correlates the wireless parameters detected by the wireless parameter detection unit with position information and time information detected by the position detection device, and a wireless network setting unit; and
a server collecting the wireless parameters correlated with the position information and the time information from the one or more communication apparatuses and performing an evaluation,
wherein the one or more communication apparatuses perform settings for the wireless network setting unit based on a determination result of the wireless parameters received from the server.

18. The communication system according to claim 17, wherein the wireless parameters correlated with the position information and the time information include information regarding the state of congestion of a base station or a communication rate, or wireless parameters capable of deriving the state of congestion of a base station or a communication rate.

19. The communication system according to claim 17, wherein the wireless parameters correlated with the position information and the time information include a reception level of a pilot signal obtained by correlation detection of scramble codes allocated to one or a plurality of base stations corresponding to a code division multiple access method, numerical values calculated from pilot signals received from a plurality of base stations, information regarding the state of congestion of a base station, or an expected value of a communication rate of a base station.

20. The communication system according to claim 17, wherein the wireless parameters correlated with the position information and the time information include information regarding a ratio of the number of sub-carriers allocated to a user with respect to a total number of sub-carriers for each frame, included in signals received from one or a plurality of base stations corresponding to an orthogonal frequency division multiple access method, information regarding a traffic situation of each base station, information regarding a ratio of the number of sub-carriers allocated to a user with respect to a total number of sub-carriers for each frame, information regarding the state of congestion of a base station, or an expected value of a communication rate of a base station.

* * * * *